US012659441B2

(12) United States Patent (10) Patent No.: US 12,659,441 B2
Ogura (45) Date of Patent: Jun. 16, 2026

(54) INFORMATION PROCESSING DEVICE, INFORMATION PROCESSING METHOD, AND INFORMATION PROCESSING SYSTEM

(71) Applicant: Sony Group Corporation, Tokyo (JP)

(72) Inventor: Sho Ogura, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 246 days.

(21) Appl. No.: 18/019,389

(22) PCT Filed: Sep. 9, 2021

(86) PCT No.: PCT/JP2021/033075
§ 371 (c)(1),
(2) Date: Feb. 2, 2023

(87) PCT Pub. No.: WO2022/065040
PCT Pub. Date: Mar. 31, 2022

(65) Prior Publication Data
US 2023/0300309 A1 Sep. 21, 2023

(30) Foreign Application Priority Data
Sep. 23, 2020 (JP) ................................. 2020-158545

(51) Int. Cl.
| *H04N 13/00* | (2018.01) |
| *H04N 13/111* | (2018.01) |
| *H04N 13/139* | (2018.01) |
| *H04N 13/161* | (2018.01) |
| *H04N 13/194* | (2018.01) |

(52) U.S. Cl.
CPC ......... *H04N 13/111* (2018.05); *H04N 13/139* (2018.05); *H04N 13/161* (2018.05); *H04N 13/194* (2018.05)

(58) Field of Classification Search
CPC .. H04N 13/111; H04N 13/139; H04N 13/194; H04N 13/161
See application file for complete search history.

(56) References Cited

U.S. PATENT DOCUMENTS

| 2014/0049609 A1* | 2/2014 | Wilson | ................. H04N 13/271 |
| | | | 348/46 |
| 2018/0176468 A1* | 6/2018 | Wang | ....................... G09G 5/14 |

(Continued)

FOREIGN PATENT DOCUMENTS

| EP | 3672251 A1 | 6/2020 |
| JP | 2016-167699 A | 9/2016 |

(Continued)

*Primary Examiner* — Zhihan Zhou
(74) *Attorney, Agent, or Firm* — Paratus Law Group, PLLC

(57) ABSTRACT

There is provided an information processing device, an information processing method, and an information processing system capable of achieving more favorable distribution of a wide range image. A control unit performs control to encode, in an image, a viewpoint region corresponding to the user's viewpoint on a display device with a first resolution, a recommended region set in the image with a second resolution, and other regions with a third resolution lower than the first resolution and the second resolution. The present technology can be applied to an image distribution system, for example.

15 Claims, 22 Drawing Sheets

(56) References Cited

U.S. PATENT DOCUMENTS

| 2019/0124277 A1* | 4/2019 | Mabuchi ................. G03B 17/02 |
| 2019/0158815 A1* | 5/2019 | He .................. H04N 21/234345 |
| 2019/0373245 A1* | 12/2019 | Lee .................... H04N 21/8456 |
| 2019/0379876 A1* | 12/2019 | Hur ...................... H04N 13/178 |
| 2019/0379917 A1* | 12/2019 | Sugio ............... H04N 21/23439 |
| 2019/0394502 A1* | 12/2019 | Hirabayashi ............ G06F 13/00 |
| 2019/0394509 A1* | 12/2019 | Oto ...................... H04N 21/816 |
| 2020/0014905 A1* | 1/2020 | Oh ...................... H04N 21/8456 |
| 2020/0195997 A1* | 6/2020 | Yoshikawa .......... H04N 23/951 |
| 2021/0409670 A1* | 12/2021 | Oh .................... H04N 21/23614 |
| 2022/0264080 A1* | 8/2022 | Harviainen ........ H04N 21/2343 |
| 2023/0132473 A1* | 5/2023 | Lee ...................... H04N 13/351 |
|  |  | 382/154 |

FOREIGN PATENT DOCUMENTS

| JP |  | 2019-169929 | A | 10/2019 |
| WO | WO | 2018/128097 | A1 | 7/2018 |
| WO | WO | 2018/155670 | A1 | 8/2018 |
| WO | WO | 2019/054360 | A1 | 3/2019 |

* cited by examiner

| VIEWPOINT REGION | RECOMMENDED REGION |
|---|---|
| V11 | R12 |

VIEWPOINT REGION ⇧ ENCODE WITH HIGH RESOLUTION

RECOMMENDED REGION ⇧ ENCODE WITH MEDIUM RESOLUTION

OTHER REGIONS ⇧ ENCODE WITH LOW RESOLUTION

TRANSMIT AS ONE STREAM

RECOMMENDED REGION
(MEDIUM RESOLUTION)

OTHER REGIONS
(LOW RESOLUTION)

VIEWPOINT REGION
(HIGH RESOLUTION)

RECOMMENDED REGION

R22

VIEWPOINT REGION

V21

R23

RECOMMENDED REGION

VIEWPOINT REGION

V31

RECOMMENDED REGION

INFORMATION PROCESSING DEVICE, INFORMATION PROCESSING METHOD, AND INFORMATION PROCESSING SYSTEM

CROSS REFERENCE TO PRIOR APPLICATION

This application is a National Stage Patent Application of PCT International Patent Application No. PCT/JP2021/033075 (filed on Sep. 9, 2021) under 35 U.S.C. § 371, which claims priority to Japanese Patent Application No. 2020-158545 (filed on Sep. 23, 2020), which are all hereby incorporated by reference in their entirety.

TECHNICAL FIELD

The present disclosure relates to an information processing device, an information processing method, and an information processing system, and more particularly, to an information processing device, an information processing method, and an information processing system capable of achieving more favorable distribution of a wide range image.

BACKGROUND ART

Normally, in a case where a panoramic image such as a virtual reality (VR) image is viewed on a display device such as a head mounted display (HMD) or a tablet terminal, only a partial region of the panoramic image is displayed.

As a highly efficient method of distributing such a panoramic image, a method of distributing a user's viewing region with high resolution and other regions with low resolution using head tracking or eye tracking is known. This method achieves band saving and load reduction of a display device.

For example, Patent Document 1 discloses a video distribution method of distributing high-resolution video data for a partial video including a current presentation region to be presented to a user, and distributing low-resolution video data for other partial videos.

CITATION LIST

Patent Document

Patent Document 1: Japanese Patent Application Laid-Open No. 2016-167699

SUMMARY OF THE INVENTION

Problems to be Solved by the Invention

However, in the conventional technology, in some cases, the panoramic image is not favorably distributed when the viewing direction is changed.

The present disclosure has been made in view of such a situation, and an object thereof is to achieve more favorable distribution of a wide range image.

Solutions to Problems

An information processing device according to a first aspect of the present disclosure is an information processing device including a control unit that performs control to encode, in an image, a viewpoint region corresponding to a user's viewpoint on a display device with a first resolution, a recommended region set in the image with a second resolution, and another region with a third resolution lower than the first resolution and the second resolution.

An information processing method according to the first aspect of the present disclosure is an information processing method including an information processing device performing control to encode, in an image, a viewpoint region corresponding to a user's viewpoint on a display device with a first resolution, a recommended region set in the image with a second resolution, and another region with a third resolution lower than the first resolution and the second resolution.

An information processing device according to a second aspect of the present disclosure is an information processing device including an acquisition control unit that performs control to acquire, from an image transmitted from a distribution server, image data in which a viewpoint region corresponding to a user's viewpoint is encoded with a first resolution and the image data in which a recommended region set in the image is encoded with a second resolution via different transmission paths, and a display control unit that displays the viewpoint region on the basis of the image data, in which when the user's viewpoint moves to the recommended region, the display control unit displays the recommended region instead of the viewpoint region.

An information processing method according to a second aspect of the present disclosure is an information processing method including an information processing device performing control to acquire, from an image transmitted from a distribution server, image data in which a viewpoint region corresponding to a user's viewpoint is encoded with a first resolution and the image data in which a recommended region set in the image is encoded with a second resolution via different transmission paths, displaying the viewpoint region on the basis of the image data, and when the user's viewpoint moves to the recommended region, displaying the recommended region instead of the viewpoint region.

An information processing system according to a third aspect of the present disclosure is an information processing system including a distribution server and a display device, in which the distribution server includes a control unit that performs control to encode, in an image, a viewpoint region corresponding to a user's viewpoint on the display device with a first resolution, a recommended region set in the image with a second resolution, and another region with a third resolution lower than the first resolution and the second resolution.

In the first and third aspects of the present disclosure, control is performed to encode, in an image, a viewpoint region corresponding to a user's viewpoint on a display device with a first resolution, a recommended region set in the image with a second resolution, and another region with a third resolution lower than the first resolution and the second resolution.

In the second aspect of the present disclosure, control is performed to acquire, from an image transmitted from a distribution server, image data in which a viewpoint region corresponding to a user's viewpoint is encoded with a first resolution and the image data in which a recommended region set in the image is encoded with a second resolution via different transmission paths, the viewpoint region is displayed on the basis of the image data, and when the user's viewpoint moves to the recommended region, the recommended region is displayed instead of the viewpoint region.

BRIEF DESCRIPTION OF DRAWINGS

FIG. 2 is a block diagram illustrating a functional configuration example of the image distribution system.

FIG. 3 is a diagram illustrating an example of distribution of each region of a wide range image.

FIG. 4 is a diagram illustrating an example of RWP data.

FIG. 5 is a diagram illustrating an example of image data including a recommended region.

FIG. 8 is a diagram illustrating an example of a recommended region.

FIG. 9 is a diagram illustrating an example of a recommended region.

FIG. 11 is a block diagram illustrating another functional configuration example of the image distribution system.

FIG. 12 is a diagram illustrating an example of distribution of each region of a wide range image.

FIG. 18 is a diagram illustrating an example of processing in a case where a viewpoint region and a recommended region overlap.

FIG. 19 is a diagram illustrating an example of processing in a case where a viewpoint region and a recommended region overlap.

FIG. 20 is a diagram illustrating an example of processing in a case where a viewpoint region and a recommended region overlap.

FIG. 22 is a block diagram illustrating a hardware configuration example of a computer.

MODES FOR CARRYING OUT THE INVENTION

Hereinafter, modes for carrying out the present disclosure (hereinafter referred to as embodiments) will be described. Note that the description will be given in the following order.

1. Overview of image distribution system
2. First embodiment (distribution by one stream)
3. Variation of recommended region
4. Second embodiment (distribution by plurality of streams)
5. Example of processing according to recommended region
6. Computer configuration example <1. Overview of Image Distribution System>

Figure 1:
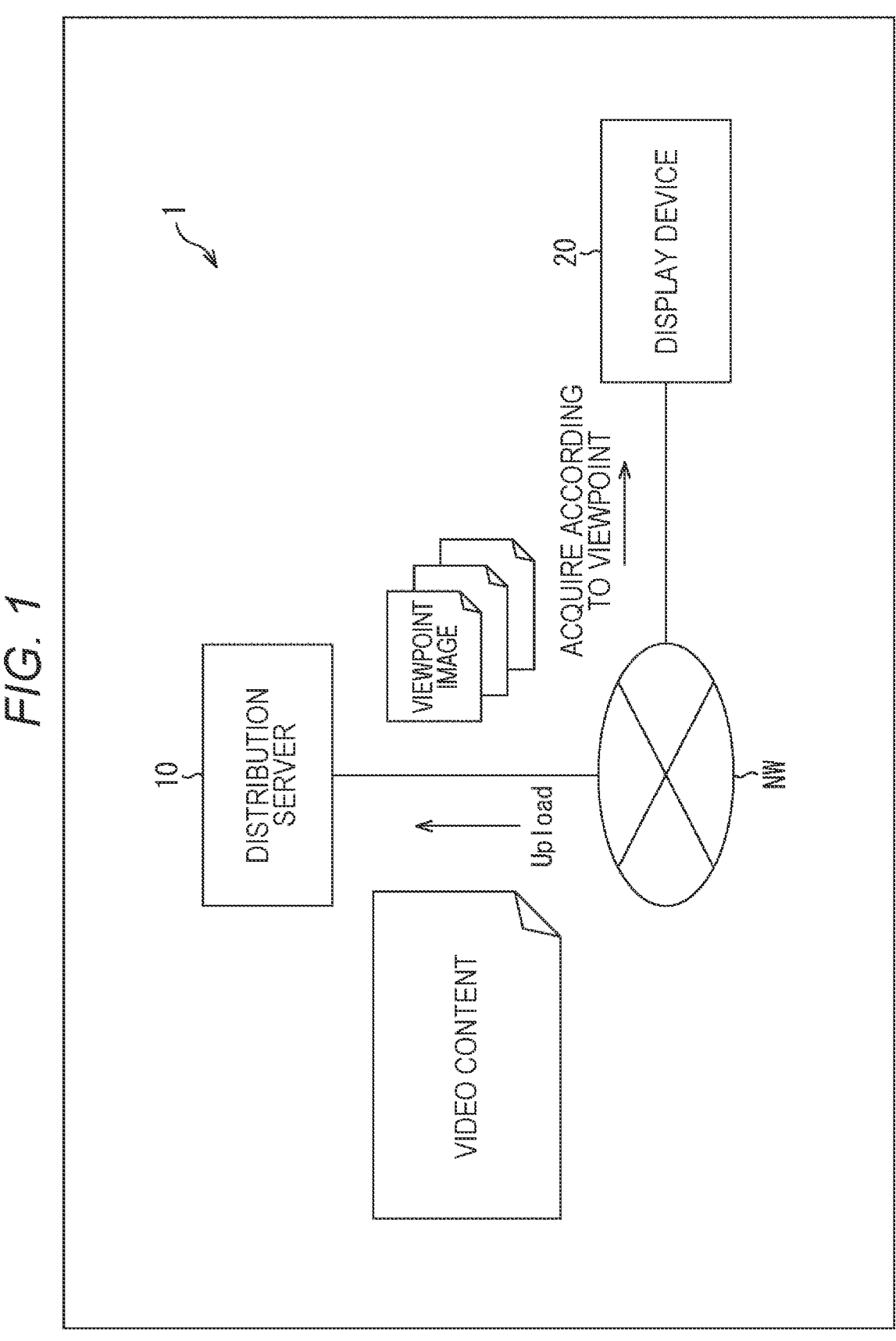
FIG. 1 is a diagram illustrating an outline of an image distribution system according to an embodiment of the present disclosure.

FIG. 1 is a diagram illustrating an outline of an image distribution system according to the present embodiment.

As illustrated in FIG. 1, an image distribution system 1 includes a distribution server 10 and a display device 20 connected to the distribution server 10 via a network NW.

The distribution server 10 is included in so-called cloud computing constructed on the network NW such as the Internet. An image (hereinafter also referred to as wide range image) showing a range wider than a range that can be displayed in the display region of the display device 20, such as an omnidirectional image obtained by imaging real space with a 360-degree camera or a VR image such as a 360-degree CG image generated by computer graphics (CG), is uploaded to the distribution server 10 as a video content. A wide range image is not limited to a 360-degree image that enables viewing of the entire 360-degree surroundings, and includes, for example, a 180-degree image that enables viewing of the 180-degree surroundings. In the following description, a wide range image is a moving image, but may be a still image. The distribution server 10 distributes an uploaded video content (wide range image) to the display device 20 via the network NW. The distribution of a video content may be real-time distribution or video on demand (VOD) distribution.

The display device 20 is a head mounted display (HMD), a tablet terminal, or the like. In a case where the display device 20 is an HMD, only a partial region of the video content is displayed in a display region (display unit) of the display device 20 according to the user's viewpoint (direction of head or direction of line-of-sight). Furthermore, in a case where the display device 20 is a tablet terminal, only a partial region of the video content is displayed according to an operation (touch input to touch panel as display unit, inclination of tablet terminal detected by gyro sensor, and the like) of the user.

Specifically, the distribution server 10 generates a viewpoint image obtained by encoding the video content for each region (for each viewpoint) on the basis of the uploaded video content. The display device 20 acquires a viewpoint image corresponding to a user's viewpoint by requesting the distribution server 10 to transmit the viewpoint image according to the user's viewpoint.

At this time, the distribution server 10 distributes the viewpoint region corresponding to the user's viewpoint with high resolution, a recommended region set in the video content with medium resolution, and the other regions with low resolution. As a result, even when the user's viewpoint moves to the recommended region where the user is likely to pay attention, the user can view the image with a certain quality.

Here, high resolution refers to the highest resolution among resolutions supported by the display device 20, a resolution that achieves the highest quality guaranteed as a video content, a resolution of the image captured by the camera as it is, or the like. On the other hand, low resolution is a resolution lower than high resolution, and refers to the minimum resolution that can be viewed without failure as a video content. Then, medium resolution refers to a resolution lower than high resolution and higher than low resolution. Medium resolution may be a resolution as close to high resolution as possible while being affected by the distribution band and the like, or may be the same resolution as high resolution in an environment where there is a margin in the distribution band.

These resolutions (high resolution, medium resolution, low resolution) may be determined in advance regardless of the image distribution system 1, or may be settable for each image distribution system 1. Furthermore, these resolutions may be appropriately settable by the user.

Hereinafter, a specific configuration of the image distribution system according to the present embodiment will be described.

<2. First Embodiment>
(Block Diagram of Image Distribution System)

Figure 2:
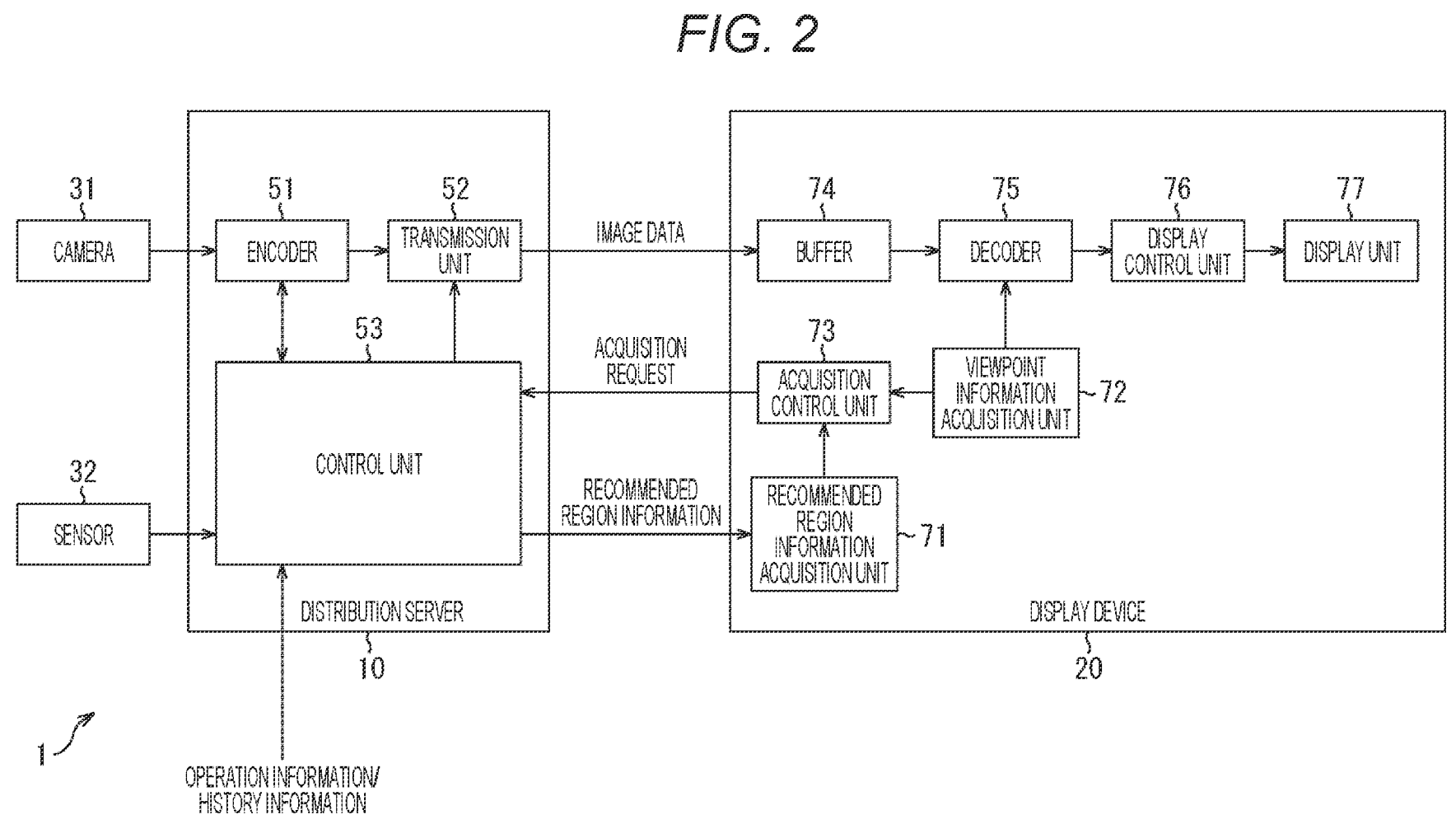

FIG. 2 is a block diagram illustrating a functional configuration example of the image distribution system 1 according to the first embodiment.

The image distribution system 1 of FIG. 2 includes a camera 31 and a sensor 32 in addition to the distribution server 10 and the display device 20.

The camera 31 and the sensor 32 are installed in an imaging site for imaging a performer of a drama, a movie, or the like, a live venue for recording a live show of an artist, a stadium for imaging a player or a director in a sports event such as soccer, rugby, or track and field, or the like, to image and sense the performer, the artist, the player, or the like.

The camera 31 is capable of capturing a wide range image, and is, for example, a 360-degree camera. In this case, the omnidirectional image in which the imaging site, the live venue, the stadium, or the like is shot by the camera 31 is uploaded to the distribution server 10 as a wide range image.

The sensor 32 is capable of acquiring a position (distance) of the subject such as a performer, an artist, or a player imaged by the camera 31, and is, for example, a stereo camera, a depth sensor, or the like. The sensing result of the performer, artist, or player sensed by the sensor 32 is also uploaded to the distribution server 10 together with the wide range image. The wide range image and the sensing result are preferably synchronized with each other. Note that the sensor 32 may be directly attached to the performer, artist, player, or the like.

The distribution server 10 includes an encoder 51, a transmission unit 52, and a control unit 53.

Under the control of the control unit 53, the encoder 51 encodes the wide range image captured by the camera 31 for each region, thereby generating image data in which each region of the wide range image is encoded.

Under the control of the control unit 53, the transmission unit 52 transmits image data corresponding to an acquisition request from the display device 20 among the image data generated by the encoder 51 to the display device 20 as one stream.

The control unit 53 controls each unit of the distribution server 10 including the encoder 51 and the transmission unit 52.

Specifically, the control unit 53 controls generation of image data for each region by the encoder 51 and controls transmission of image data by the transmission unit 52.

For example, the control unit 53 performs control to encode, in the wide range image, a viewpoint region corresponding to the user's viewpoint on the display device 20 with a first resolution, a recommended region set in the wide range image with a second resolution, and other regions with a third resolution lower than the first resolution and the second resolution. A recommended region is a region that is recommended for the user who views the wide range image to pay particular attention to. The first resolution is higher than or equal to the second resolution. Here, the encoder 51 generates image data in which a viewpoint region is encoded with high resolution, a recommended region is encoded with medium resolution, and other regions are encoded with low resolution.

A recommended region is set on the basis of a sensing result of a subject in a wide range image from the sensor 32, operation information indicating an operation of a director, an imaging staff, or the like present at an imaging site, a live venue, or a stadium, viewing history information indicating a viewing history of other users who viewed the distributed wide range image, and the like. In a wide range image, a plurality of recommended regions can be set temporally and spatially.

Furthermore, the control unit 53 generates recommended region information representing a recommended region set in a wide range image. Recommended region information includes a temporal position (reproduction time) and a spatial position (direction) of a recommended region in a wide range image.

The control unit 53 supplies recommended region information to the display device 20 in synchronization with image data transmitted from the transmission unit 52 to the display device 20. Recommended region information may be packed in image data as metadata of the image data and transmitted to the display device 20.

The display device 20 includes a recommended region information acquisition unit 71, a viewpoint information acquisition unit 72, an acquisition control unit 73, a buffer 74, a decoder 75, a display control unit 76, and a display unit 77.

The recommended region information acquisition unit 71 acquires recommended region information from the distribution server 10 and supplies the recommended region information to the acquisition control unit 73.

The viewpoint information acquisition unit 72 acquires viewpoint information representing the viewpoint of the user viewing the wide range image, and supplies the viewpoint information to the acquisition control unit 73 and the decoder 75. The viewpoint information may be a line-of-sight detection result obtained by eye tracking, or may be information indicating the orientation and posture of the head obtained by head tracking.

The acquisition control unit 73 requests the distribution server 10 to acquire image data of a viewpoint region corresponding to the user's viewpoint on the basis of the viewpoint information from the viewpoint information acquisition unit 72.

As a result, the buffer 74 acquires image data (high-resolution image data) of a viewpoint region corresponding to the user's viewpoint. Furthermore, the buffer 74 acquires medium-resolution image data of the recommended region and low-resolution image data of other regions, together with the image data of the viewpoint region. The acquired image data is temporarily held in the buffer 74 and sequentially supplied to the decoder 75.

The decoder 75 decodes image data corresponding to the user's viewpoint sequentially supplied from the buffer 74 on the basis of the viewpoint information from the viewpoint information acquisition unit 72, and supplies the decoded image data to the display control unit 76.

The display control unit 76 causes the display unit 77 as a display to display the high-resolution viewpoint region on the basis of the image data decoded by the decoder 75.

(Distribution of Wide Range Image)

Here, distribution of a wide range image in the image distribution system 1 of FIG. 2 will be described.

FIG. 3 is a diagram illustrating an example of distribution of each region of a wide range image.

In a wide range image P10 illustrated in FIG. 3, it is assumed that a viewpoint region V11 corresponding to the user's viewpoint and a recommended region R12 are set. In this case, in the image distribution system 1 of FIG. 2, image data in which the viewpoint region V11 is encoded with high resolution, the recommended region R12 is encoded with medium resolution, and the other regions are encoded with low resolution is transmitted as one stream. For example, the image data is transmitted as region wise packing (RWP) data obtained by packing each frame of the wide range image while changing the resolution for each region.

Figure 4:
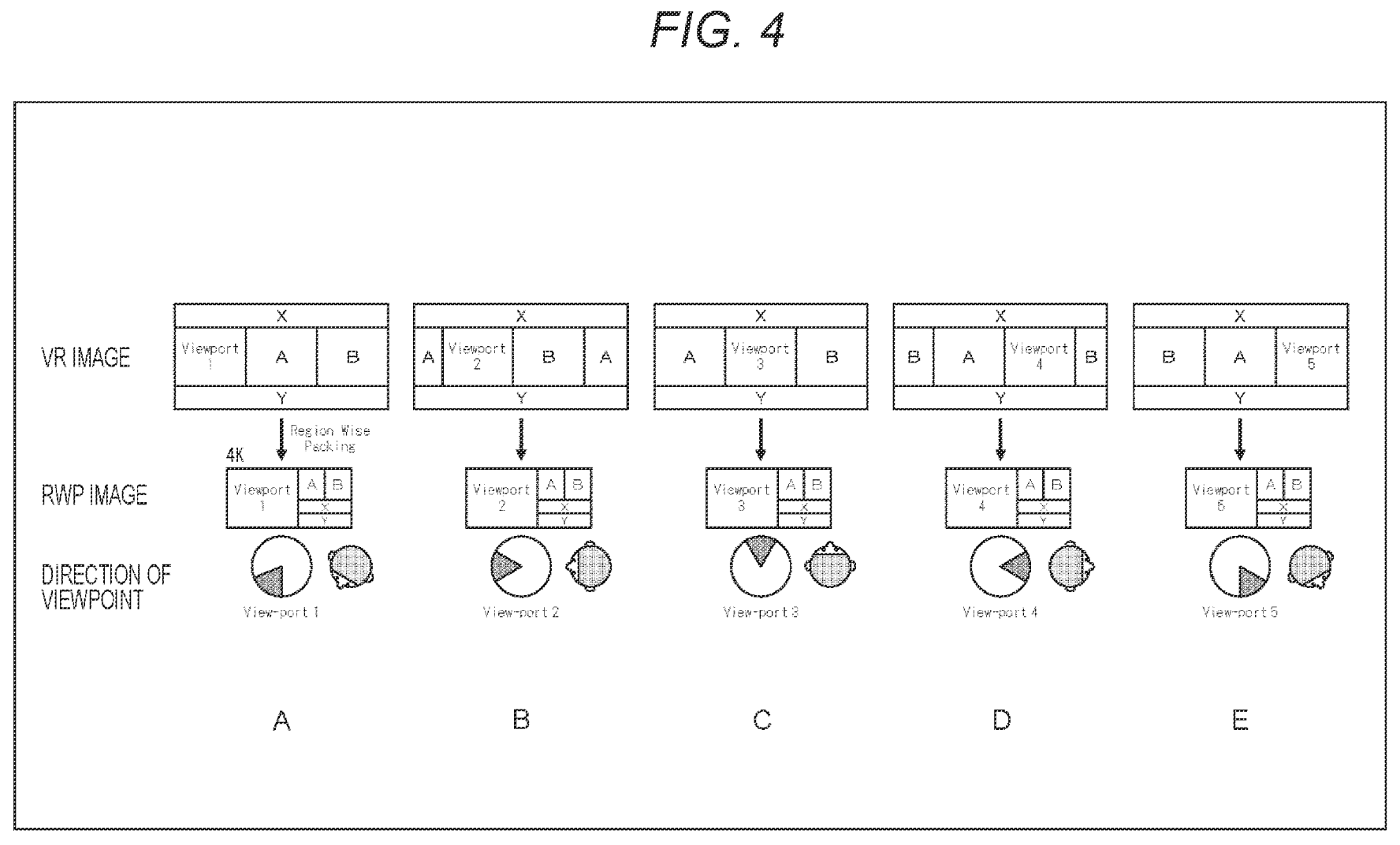

FIG. 4 is a diagram illustrating an example of RWP data.

RWP data is, for example, encoded data in which (each frame of) a wide range image of 11 K size is changed in position and size for each region, and the regions are arranged on a two-dimensional plane so as to form a rectangle as a whole and packed in a 4 K size. In the example of FIG. 4, five pieces of RWP data in which five regions in one frame of the VR image are packed as a viewport (display region) are illustrated.

Diagram A of FIG. 4 illustrates RWP data in which, in the VR image, a region indicated by Viewport1 is packed with high resolution, regions indicated by A and B are packed with medium resolution, and regions indicated by X and Y are packed with low resolution. Here, Viewport1 corresponds to a viewpoint region obliquely rearward on the left of the user, and for example, when the user's viewpoint moves obliquely rearward to the left, the RWP data in Diagram A is transmitted to the display device 20.

Diagram B of FIG. 4 illustrates RWP data in which, in the VR image, a region indicated by Viewport2 is packed with high resolution, regions indicated by A and B are packed with medium resolution, and regions indicated by X and Y are packed with low resolution. Here, Viewport2 corresponds to a left viewpoint region of the user, and for example, when the user's viewpoint moves leftward, the RWP data in Diagram B is transmitted to the display device 20.

Diagram C of FIG. 4 illustrates RWP data in which, in the VR image, a region indicated by Viewport3 is packed with high resolution, regions indicated by A and B are packed with medium resolution, and regions indicated by X and Y are packed with low resolution. Here, Viewport3 corresponds to a viewpoint region at the front of the user, and in a case where the user's viewpoint is at the front, the RWP data in Diagram C is transmitted to the display device 20.

Diagram D of FIG. 4 illustrates RWP data in which, in the VR image, a region indicated by Viewport4 is packed with high resolution, regions indicated by A and B are packed with medium resolution, and regions indicated by X and Y are packed with low resolution. Here, Viewport4 corresponds to a right viewpoint region of the user, and for example, when the user's viewpoint moves rightward, the RWP data in Diagram D is transmitted to the display device 20.

Diagram E of FIG. 4 illustrates RWP data in which, in the VR image, a region indicated by Viewport5 is packed with high resolution, regions indicated by A and B are packed with medium resolution, and regions indicated by X and Y are packed with low resolution. Here, Viewport5 corresponds to a viewpoint region obliquely rearward on the right of the user, and for example, when the user's viewpoint moves obliquely rearward to the right, the RWP data in Diagram E is transmitted to the display device 20.

Figure 5:
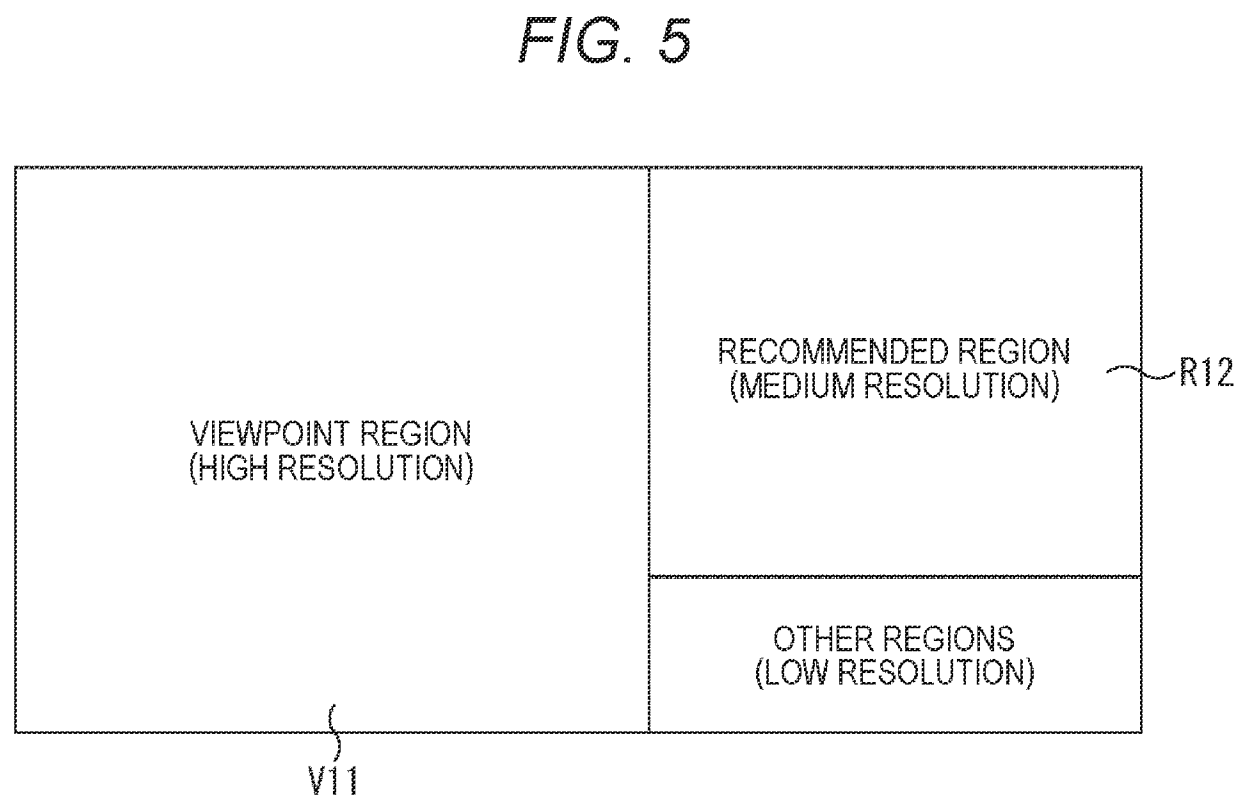

In this manner, in the present embodiment, RWP data is transmitted as image data. For example, in a case where image data obtained by encoding the wide range image P10 in FIG. 3 is transmitted, RWP data in which the viewpoint region V11 is packed with high resolution, the recommended region R12 is packed with medium resolution, and the other regions are packed with low resolution as illustrated in FIG. 5 is transmitted.

(Flow of Operation of Display Device)

Next, a flow of operation of the display device 20 will be described with reference to the flowchart of FIG. 6.

Figure 6:
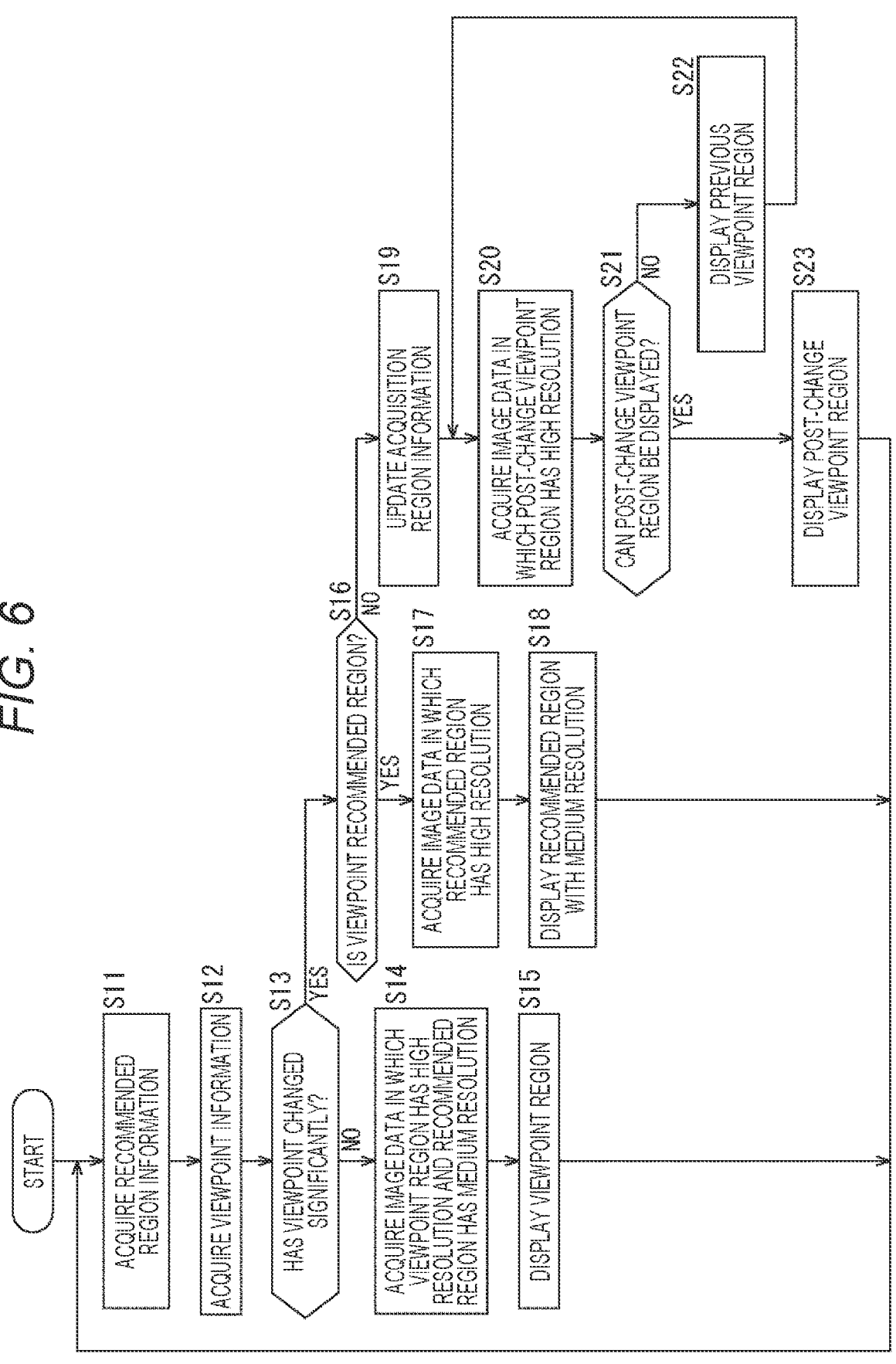
FIG. 6 is a flowchart for describing a flow of operation of a display device.

Basically, the processing in FIG. 6 is repeated at timings corresponding to the drawing speed of images on the display unit 77, for example.

In step S11, the recommended region information acquisition unit 71 acquires recommended region information from the distribution server 10.

In step S12, the viewpoint information acquisition unit 72 acquires viewpoint information representing the viewpoint of the user viewing a wide range image.

In step S13, the acquisition control unit 73 determines whether or not the user's viewpoint has changed significantly on the basis of the viewpoint information acquired by the viewpoint information acquisition unit 72.

If it is determined in step S13 that the user's viewpoint has not changed significantly, the processing proceeds to step S14.

In step S14, the acquisition control unit 73 requests the distribution server 10 to acquire image data in which a viewpoint region corresponding to the user's viewpoint at that time has high resolution, and a recommended region represented by the recommended region information acquired in step S11 has medium resolution. The buffer 74 acquires the image data transmitted from the distribution server 10 in response to the request from the acquisition control unit 73.

In step S15, the decoder 75 decodes the image data acquired by the buffer 74 at the previous timing, and the display control unit 76 causes the display unit 77 to display the high-resolution viewpoint region on the basis of the image data decoded by the decoder 75. After step S15, the processing returns to step S11, and the subsequent processing is repeated.

On the other hand, if it is determined in step S13 that the user's viewpoint has changed significantly, the processing proceeds to step S16.

In step S16, the acquisition control unit 73 determines whether or not the user's viewpoint has moved to the recommended region on the basis of the viewpoint information acquired by the viewpoint information acquisition unit 72.

If it is determined in step S16 that the user's viewpoint has moved to the recommended region, the processing proceeds to step S17.

In step S17, the acquisition control unit 73 requests the distribution server 10 to acquire image data in which the recommended region has high resolution. The buffer 74 acquires the image data transmitted from the distribution server 10 in response to the request from the acquisition control unit 73.

In step S18, the decoder 75 decodes the image data acquired by the buffer 74 at the previous timing, and the display control unit 76 causes the display unit 77 to display the medium-resolution recommended region on the basis of the image data decoded by the decoder 75. After step S18, the processing returns to step S11, and the subsequent processing is repeated. In the subsequent processing, high-resolution image data with the recommended region as the viewpoint region is acquired from the distribution server 10.

Meanwhile, if it is determined in step S16 that the user's viewpoint has not moved to the recommended region, that is, if the user's viewpoint has moved to another region other than the recommended region, the processing proceeds to step S19.

In step S19, the acquisition control unit 73 updates acquisition region information indicating a region to be acquired in each region of the wide range image on the basis of the viewpoint information acquired by the viewpoint information acquisition unit 72.

In step S20, the acquisition control unit 73 requests the distribution server 10 to acquire image data in which a post-change viewpoint region, which is the viewpoint region after the user's viewpoint has changed and is represented by the updated acquisition region information, has high resolution. The buffer 74 acquires the image data transmitted from the distribution server 10 in response to the request from the acquisition control unit 73.

In step S21, the display control unit 76 determines whether or not the high-resolution post-change viewpoint region can be displayed. At this time, since the post-change viewpoint region included in the image data acquired by the buffer 74 at the previous timing has low resolution, it is determined that the post-change viewpoint region having high resolution cannot be displayed, and the processing proceeds to step S22.

In step S22, the decoder 75 decodes the image data acquired by the buffer 74 at the previous timing, and the display control unit 76 causes the display unit 77 to display the previous (high-resolution) viewpoint region on the basis of the image data decoded by the decoder 75. After step S22, the processing returns to step S20, and steps S20 and S21 are repeated. Steps S20 and S21 are also repeated at timings corresponding to the drawing speed of images on the display unit 77.

On the other hand, if it is determined in step S21 that the high-resolution post-change viewpoint region can be displayed, the processing proceeds to step S23, the decoder 75 decodes the image data acquired by the buffer 74 at the previous timing, and the display control unit 76 causes the display unit 77 to display the high-resolution post-change viewpoint region on the basis of the image data decoded by the decoder 75. After step S23, the processing returns to step S11, and the subsequent processing is repeated.

As described above, in the buffer 74, the medium-resolution recommended region is buffered together with the high-resolution viewpoint region. As a result, when the user's viewpoint moves to a region other than the recommended region, a delay occurs until the viewing region is displayed with high resolution. However, when the user's viewpoint moves to a recommended region, a recommended region that the user is likely to pay attention is displayed with medium resolution. Therefore, the user can view an image with a certain quality.

(Flow of Operation of Distribution Server)

Next, a flow of operation of the distribution server 10 will be described with reference to the flowchart of FIG. 7.

Figure 7:
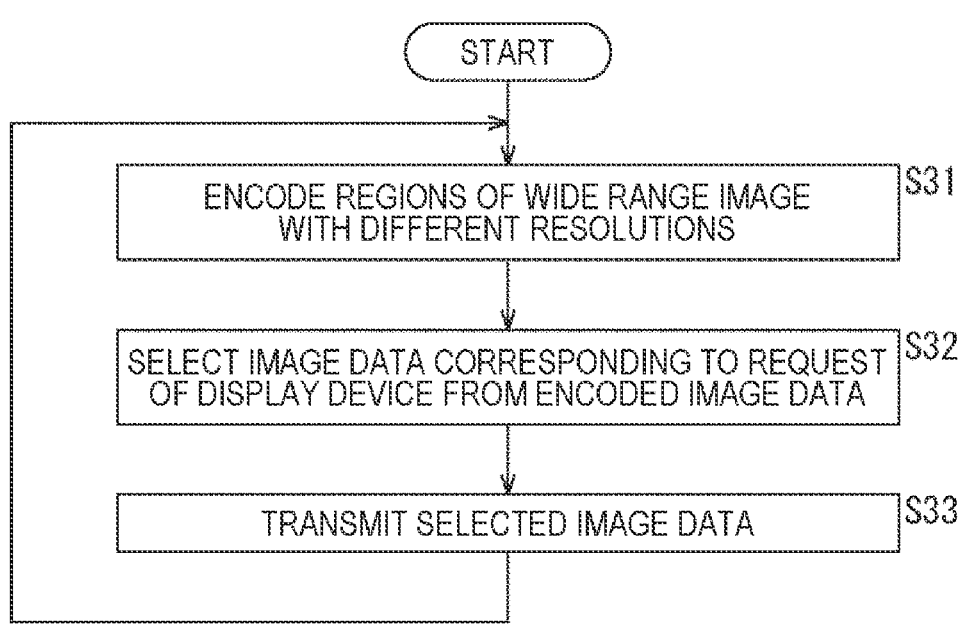
FIG. 7 is a flowchart for describing a flow of operation of a distribution server.

Basically, the processing of FIG. 7 is also repeated at timings corresponding to the drawing speed of images in the display device 20 (display unit 77), for example.

In step S31, the control unit 53 controls the encoder 51 to encode regions of a wide range image with different resolutions for each frame of the wide range image.

For example, five pieces of RWP data in which each region of the wide range image is packed as a viewport are generated. At this time, in each RWP data, if there is a region set as a recommended region, the region is packed with medium resolution. Note, however, that this does not apply to RWP data in which a region set as a recommended region is packed as a viewport.

In step S32, the control unit 53 selects image data corresponding to the request of the display device 20 from the image data encoded by the encoder 51 as a transmission target to the display device 20, on the basis of the request of the image data from the display device 20.

For example, in response to a request from the display device 20 based on viewpoint information indicating the user's viewpoint, RWP data in which a viewpoint region corresponding to the user's viewpoint is packed as a viewport is selected as a transmission target to the display device 20. Furthermore, when the user's viewpoint moves to a recommended region, RWP data in which the recommended region is packed as a viewport is selected as the transmission target to the display device 20 in response to a request from the display device 20.

In step S33, the control unit 53 controls the transmission unit 52 to transmit the image data selected as the transmission target to the display device 20 to the display device 20. After step S33, the processing returns to step S31, and the subsequent processing is repeated.

According to the above processing, image data including a medium-resolution recommended region is distributed to the display device 20 as image data in which each region of the wide range image is encoded with high resolution. As a result, even when the user's viewpoint moves to a recommended region where the user is likely to pay attention, the user can view the image with a certain quality without delay, and more favorable distribution of a wide range image can be achieved.

Note that in the above description, it is assumed that a plurality of pieces of image data in which each region of the wide range image is encoded with different resolutions is generated regardless of the request from the display device 20.

Instead, every time the distribution server 10 receives a request based on viewpoint information indicating a user's viewpoint or recommended region information indicating a recommended region from the display device 20, image data obtained by encoding a region corresponding to the user's viewpoint with high resolution and a region corresponding to the recommended region with medium resolution in each region of the wide range image may be generated.

<3. Variation of Recommended Region>

Here, variations of a recommended region set in a wide range image will be described.

In a wide range image, a plurality of recommended regions may be spatially set.

Figure 8:
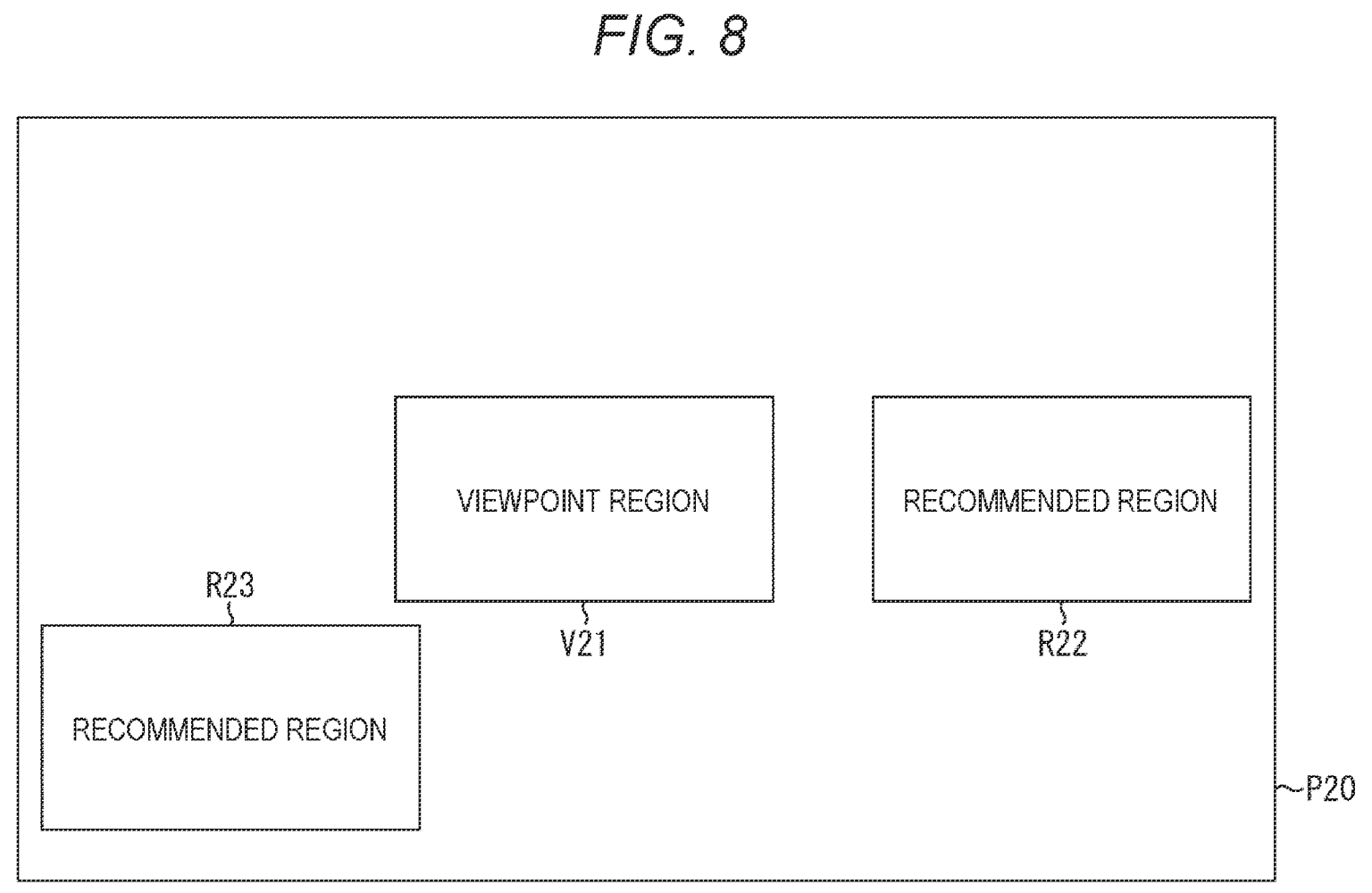

For example, as in a wide range image P20 illustrated in FIG. 8, two recommended regions R22 and R23 are set in addition to a viewpoint region V21 corresponding to the user's viewpoint.

In this case, one recommended region is selected as a final recommended region on the basis of at least one of the user's operation, preference, or line-of-sight transition.

That is, the final recommended region may be selected by the user, or may be automatically selected on the basis of the user's preference. Furthermore, as the final recommended region, a recommended region close to a viewpoint estimated on the basis of the line-of-sight transition of the user acquired in advance may be selected.

In a wide range image, a peripheral region of a recommended region may be included in the recommended region.

Figure 9:
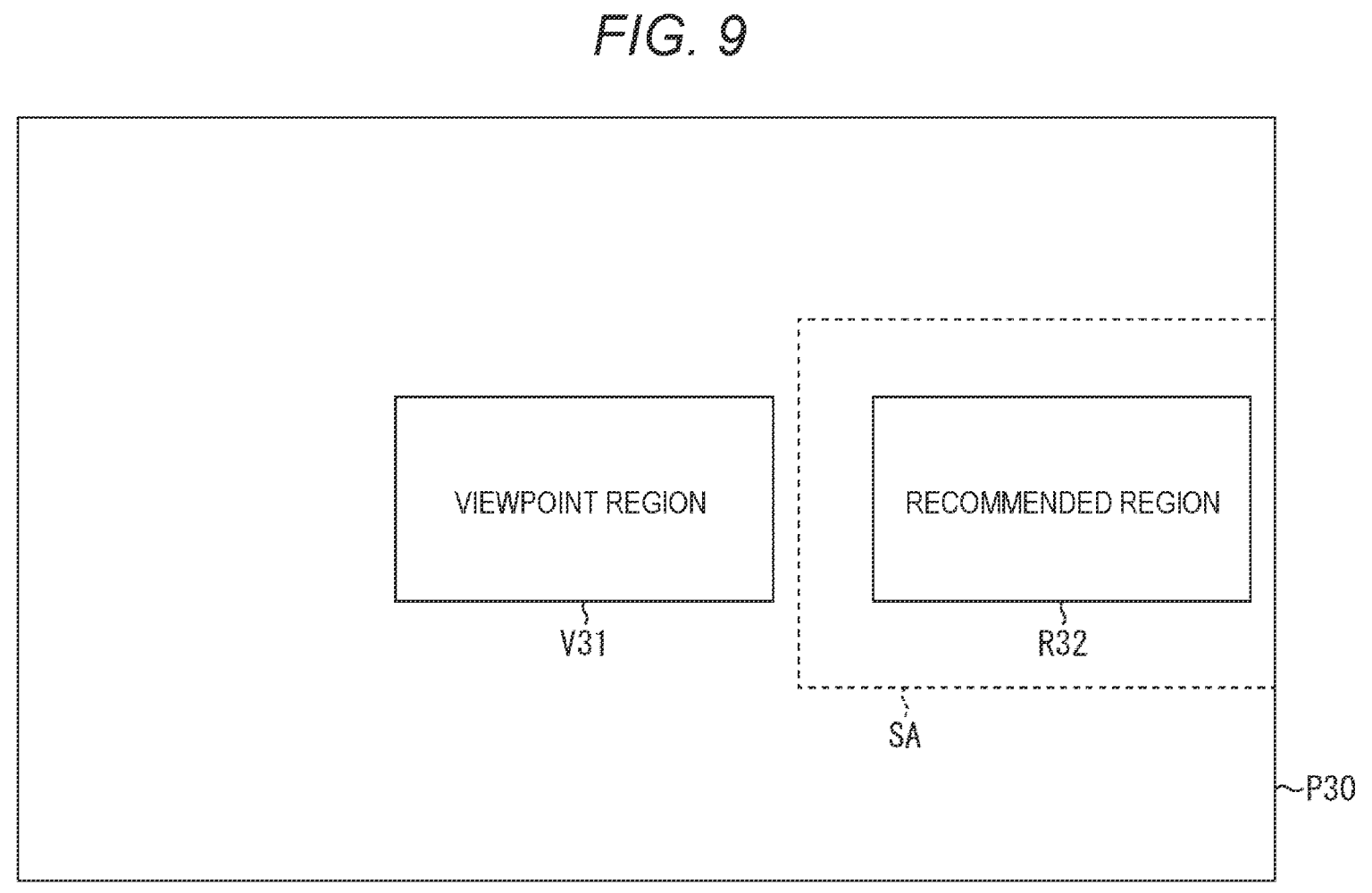

For example, in a case where a viewpoint region V31 corresponding to the user's viewpoint and a recommended region R32 are set as in a wide range image P30 illustrated in FIG. 9, a region SA having a predetermined width around the recommended region R32 indicated by a broken line frame in the drawing is also treated in the same manner as the recommended region R32.

In this case, the recommended region R32 including the region SA may be encoded with medium resolution, or the recommended region R32 may be displayed when the user's viewpoint moves to the recommended region R32 including the region SA.

In a wide range image, a viewpoint region and a part of a recommended region may overlap.

Figure 10:
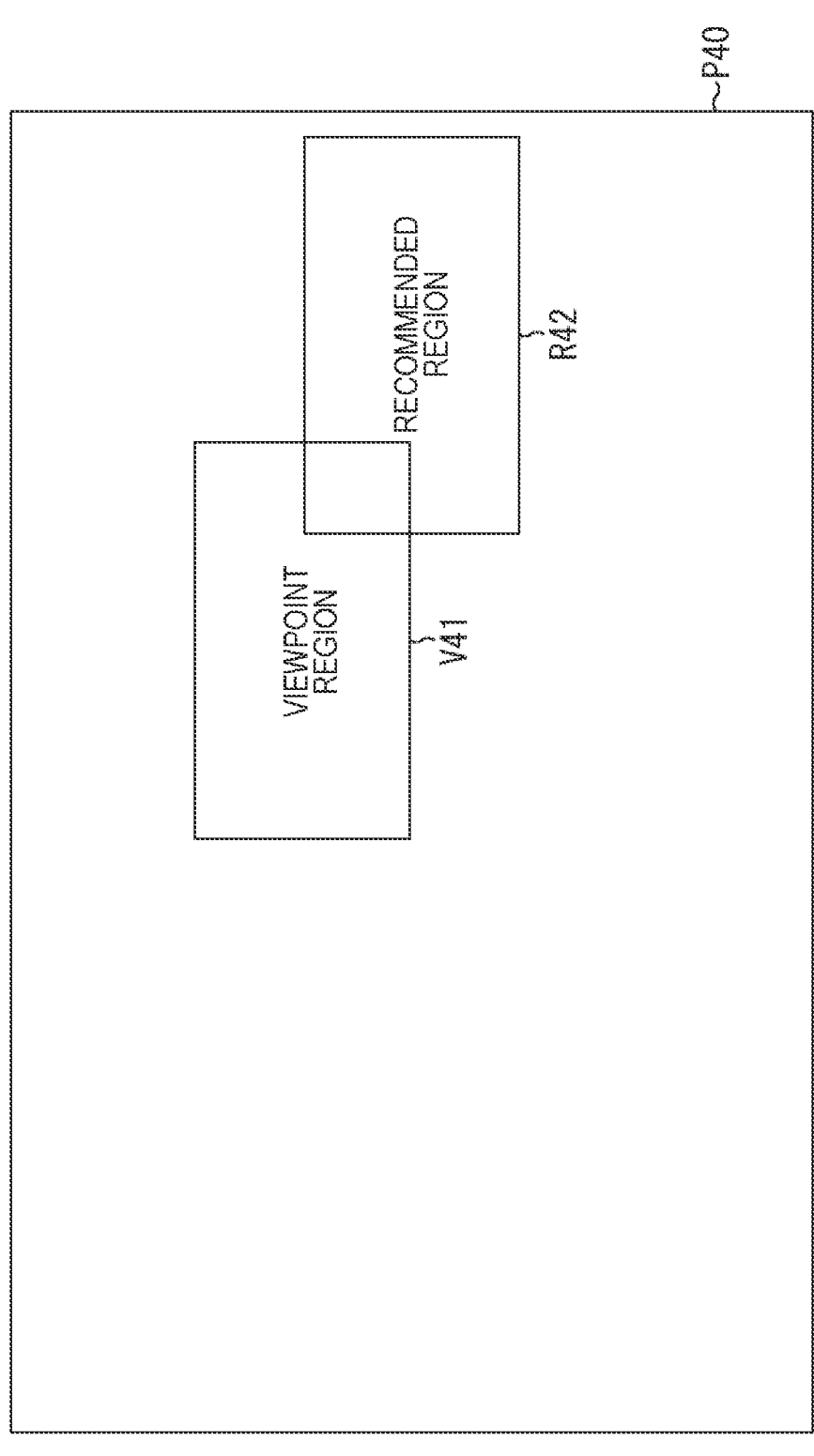
FIG. 10 is a diagram illustrating an example of a recommended region.

For example, as in a wide range image P40 illustrated in FIG. 10, consider a case where a viewpoint region V41 corresponding to the user's viewpoint and a part of a recommended region R42 overlap. In such a case, the viewpoint region may transition from the viewpoint region V41 to the recommended region R42. As a result, it is possible to allow the user to more reliably view a region that the side providing the wide range image P40 wants to recommend to the user.

<4. Second Embodiment>
(Block Diagram of Image Distribution System)

Figure 11:
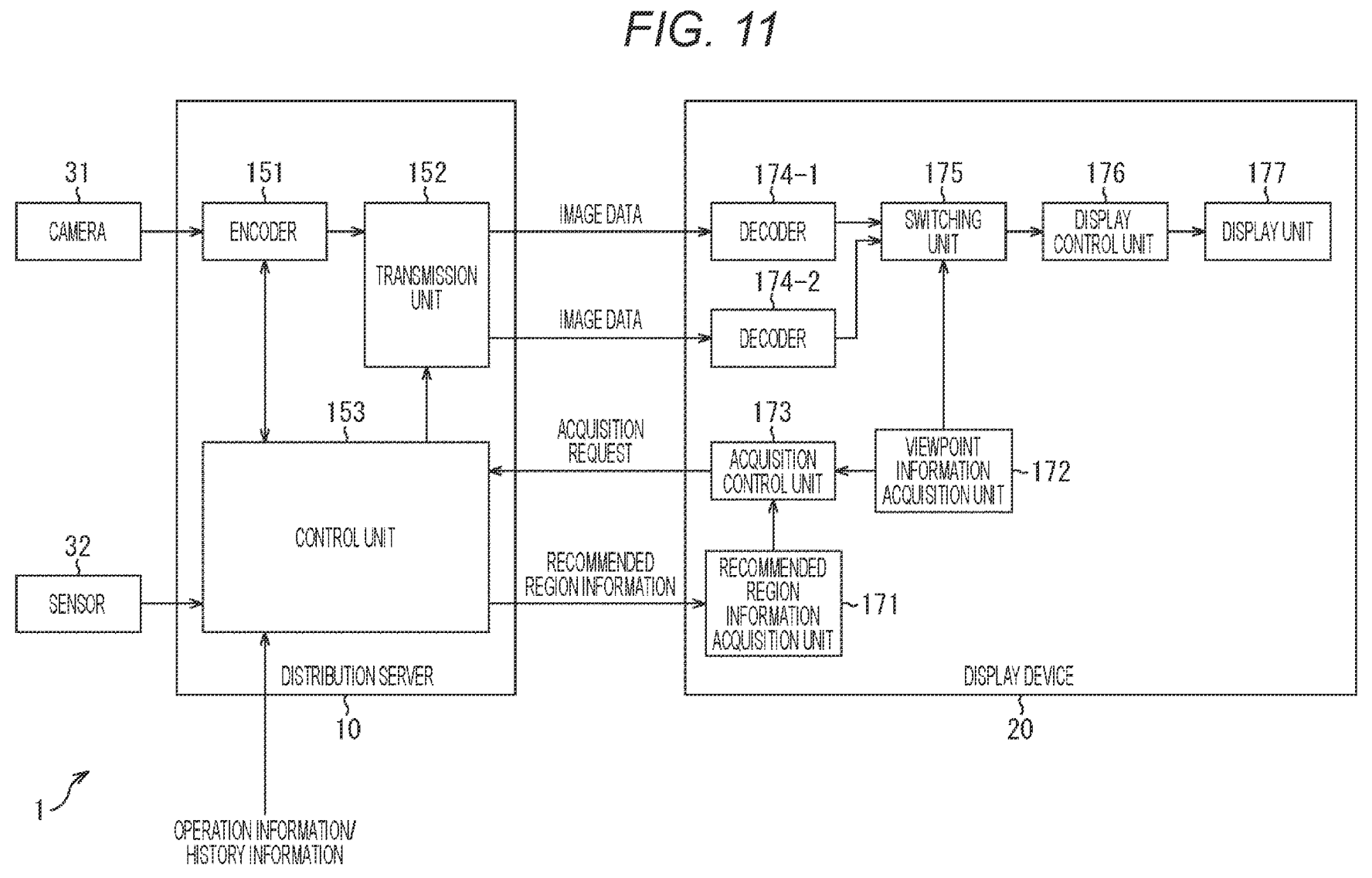

FIG. 11 is a block diagram illustrating a functional configuration example of an image distribution system 1 according to a second embodiment.

Similarly to the image distribution system of FIG. 2, the image distribution system 1 of FIG. 11 also includes a camera 31 and a sensor 32 in addition to a distribution server 10 and a display device 20.

The distribution server 10 in FIG. 11 includes an encoder 151, a transmission unit 152, and a control unit 153.

The encoder 151, the transmission unit 152, and the control unit 153 basically have functions similar to those of the encoder 51, the transmission unit 52, and the control unit 53 in FIG. 2, respectively.

Note, however, that here, the encoder 151 generates image data in which the viewpoint region and the recommended region are encoded with high resolution and the other regions are encoded with low resolution.

Furthermore, under the control of the control unit 153, the transmission unit 152 transmits image data corresponding to an acquisition request from the display device 20 among the image data generated by the encoder 151 to the display device 20 as a plurality of (two in example of FIG. 11) streams.

The display device 20 in FIG. 11 includes a recommended region information acquisition unit 171, a viewpoint information acquisition unit 172, an acquisition control unit 173, decoders 174-1, 174-2, a switching unit 175, a display control unit 176, and a display unit 177.

The recommended region information acquisition unit 171, the viewpoint information acquisition unit 172, the display control unit 176, and the display unit 177 basically have functions similar to those of the recommended region information acquisition unit 71, the viewpoint information acquisition unit 72, the display control unit 76, and the display unit 77 in FIG. 2, respectively.

The acquisition control unit 173 requests the distribution server 10 to acquire image data transmitted as a plurality of streams. Specifically, on the basis of recommended region information acquired by the recommended region information acquisition unit 171 and viewpoint information acquired by the viewpoint information acquisition unit 172, the acquisition control unit 173 performs control to acquire image data of a viewpoint region corresponding to the user's viewpoint and image data of a recommended region as different streams.

Each of the decoders 174-1, 174-2 has a function in which the buffer 74 and the decoder 75 in FIG. 2 are combined. That is, each decoder 174-1, 174-2 acquires image data from the distribution server 10, temporarily holds the image data, and sequentially decodes the held image data. The decoders 174-1, 174-2 decode image data in synchronization with each other.

The switching unit 175 switches the image data supplied to the display control unit 176 to one of the pieces of image data decoded by the decoders 174-1, 174-2 on the basis of the viewpoint information from the viewpoint information acquisition unit 172. That is, among the pieces of image data decoded by the decoders 174-1, 174-2, image data of a region corresponding to the user's line-of-sight is supplied to the display control unit 176. The display control unit 176 displays the viewpoint region on the basis of the image data from the switching unit 175, or displays the recommended region instead of the viewpoint region when the user's viewpoint moves to a recommended region.

(Distribution of Wide Range Image)

Here, distribution of a wide range image in the image distribution system 1 of FIG. 11 will be described.

Figure 12:
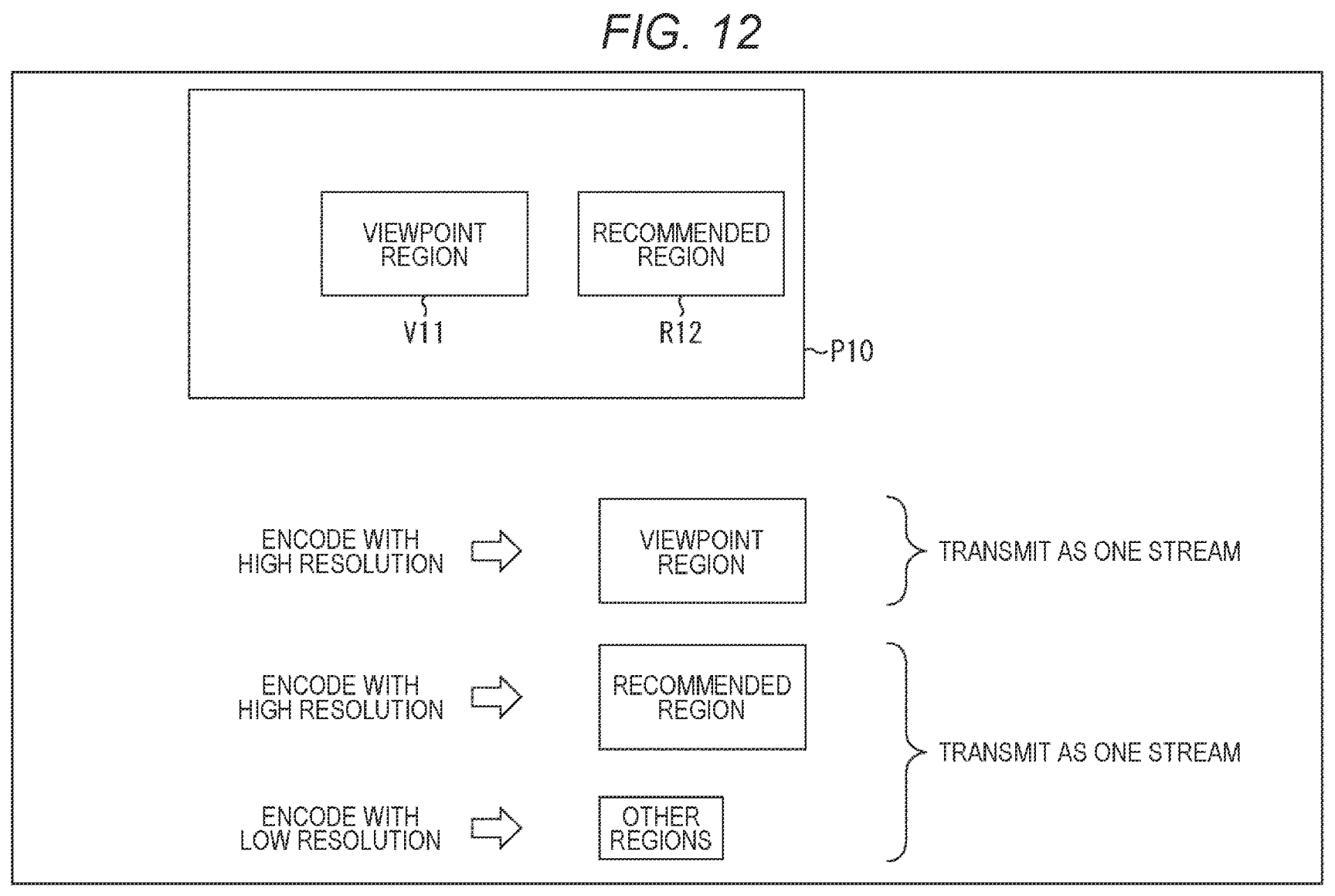

FIG. 12 is a diagram illustrating an example of distribution of each region of the wide range image.

In a wide range image P10 illustrated in FIG. 12, it is assumed that a viewpoint region V11 corresponding to the user's viewpoint and a recommended region R12 are set. In this case, in the image distribution system 1 of FIG. 11, for example, image data in which the viewpoint region V11 is encoded with high resolution is transmitted as one stream, and image data in which the recommended region R12 is encoded with high resolution and image data in which the other regions are encoded with low resolution are transmitted as another one stream. For example, the image data is transmitted as hierarchical data in which regions of the wide range image are hierarchized for each resolution.

Figure 13:
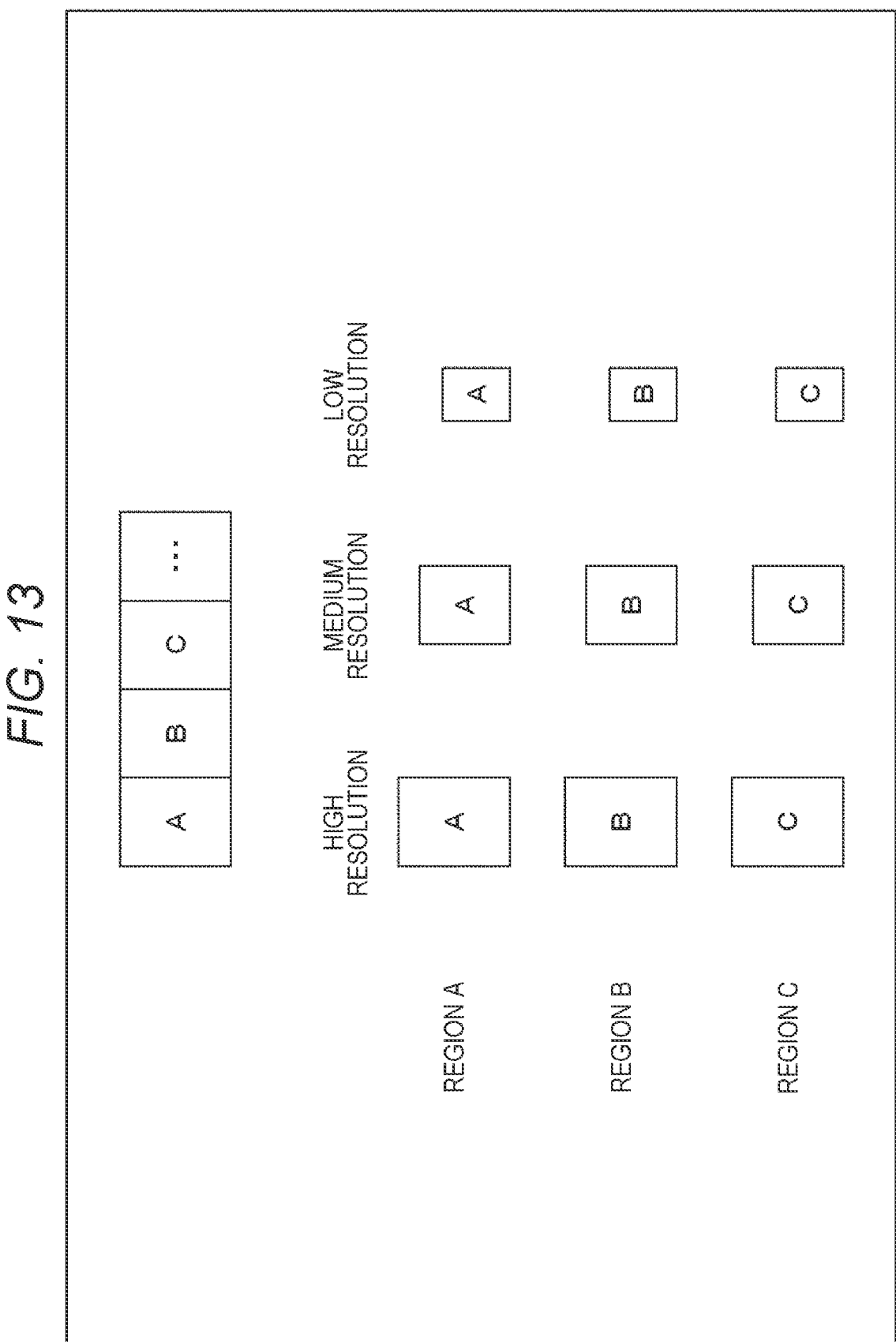
FIG. 13 is a diagram for describing hierarchical data.

FIG. 13 is a diagram illustrating an example of hierarchical data.

Hierarchical data is encoded data in which each region of (each frame of) the wide range image is encoded with different resolutions. The example of FIG. 13 illustrates encoded data in which three regions A, B, and C in one frame of a wide range image are encoded with three levels of resolutions (high resolution, medium resolution, low resolution).

In the example of FIG. 13, for example, in a case where the user's viewpoint is in region B and the recommended region is set in region C, encoded data in which region B (viewpoint region) is encoded with high resolution is transmitted to the display device 20 as one stream, and encoded data in which region C is encoded with high resolution is transmitted to the display device 20 as another one stream. At this time, for the other regions including region A, encoded data in which the regions are encoded with low resolution is transmitted to the display device 20 as one of the streams or yet another stream.

Furthermore, encoded data in which a region (viewpoint region) corresponding to the user's viewpoint is encoded with high resolution and encoded data in which a neighboring region thereof is encoded with medium resolution may be transmitted to the display device 20. Furthermore, in a case where there is no margin in the bandwidth, for a region for which the recommended region is set, encoded data in which the region is encoded with medium resolution may be transmitted to the display device 20.

In the above description, the image data transmitted as a plurality of streams is assumed to be hierarchical data. However, the image data may be the above-described RWP data.

That is, in the example of FIG. 13, in a case where the user's viewpoint is in region B and the recommended region is set in region C, it is only required that RWP data in which region B (viewpoint region) is packed with high resolution be transmitted to the display device 20 as one stream, and RWP data in which region C is packed with high resolution be transmitted to the display device 20 as another one stream.

In this manner, in the present embodiment, hierarchical data or RWP data is transmitted as image data.

(Flow of Operation of Display Device)

Next, a flow of operation of the display device 20 in FIG. 13 will be described with reference to the flowchart of FIG. 14.

Figure 14:
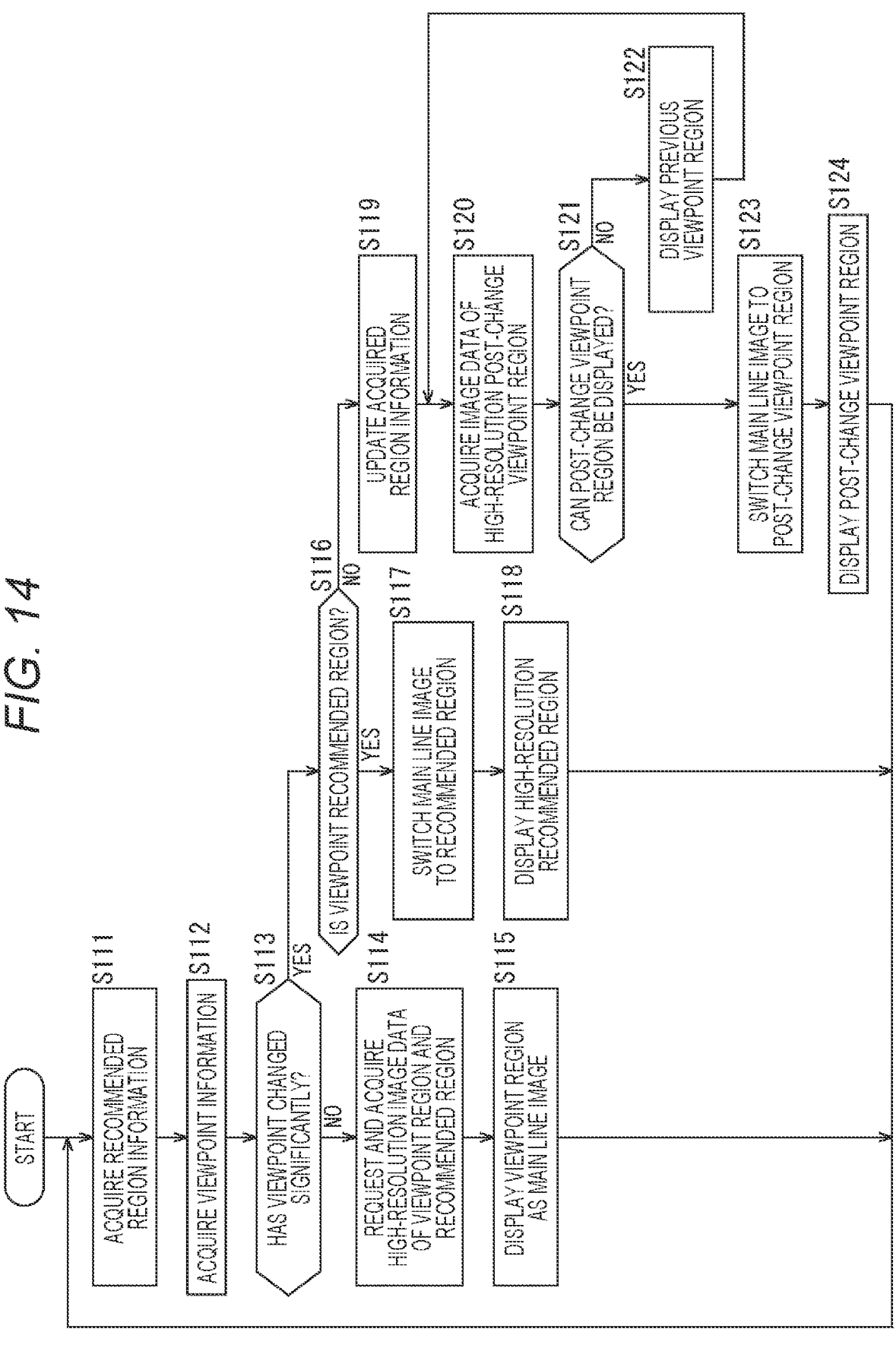
FIG. 14 is a flowchart for explaining a flow of operation of a display device.

Basically, the processing in FIG. 14 is repeated at timings corresponding to the drawing speed of images on the display unit 177, for example. Note that the processing in steps S111 to S113 in the flowchart of FIG. 14 is similar to the processing in steps S11 to S13 in the flowchart of FIG. 6, and therefore description is omitted.

That is, in a case where it is determined in step S113 that the user's viewpoint has not changed significantly, the processing proceeds to step S114.

In step S114, the acquisition control unit 173 requests the distribution server 10 to acquire high-resolution image data of a viewpoint region corresponding to the user's viewpoint at that time and high-resolution image data of a recommended region represented by recommended region information. The decoder 174-1 acquires image data of the viewpoint region transmitted from the distribution server 10 in response to the request of the acquisition control unit 173, and decodes the image data acquired at the previous timing. The decoder 174-2 acquires image data of the recommended region transmitted from the distribution server 10 in response to the request of the acquisition control unit 173, and decodes the image data acquired at the previous timing.

In step S115, the switching unit 175 supplies the image data of the viewpoint region corresponding to the user's line-of-sight decoded by the decoder 174-1 to the display control unit 176, and the display control unit 176 causes the display unit 177 to display the high-resolution viewpoint region as a main line image. After step S115, the processing returns to step S111, and the subsequent processing is repeated.

On the other hand, if it is determined in step S113 that the user's viewpoint has changed significantly, the processing proceeds to step S116.

In step S116, the acquisition control unit 173 determines whether or not the user's viewpoint has moved to a recommended region on the basis of the viewpoint information acquired by the viewpoint information acquisition unit 172.

If it is determined in step S116 that the user's viewpoint has moved to the recommended region, the processing proceeds to step S117.

In step S117, the switching unit 175 switches the main line image to the recommended region by switching image data supplied to the display control unit 176 to image data of the recommended region decoded by the decoder 174-2.

In step S118, the display control unit 176 causes the display unit 177 to display the high-resolution recommended region on the basis of the image data decoded by the decoder 174-2. After step S118, the processing returns to step S111, and the subsequent processing is repeated. In the subsequent processing, high-resolution image data with the recommended region as the viewpoint region is acquired from the distribution server 10.

Meanwhile, if it is determined in step S116 that the user's viewpoint has not moved to the recommended region, that is, if the user's viewpoint has moved to another region other than the recommended region, the processing proceeds to step S119.

In step S119, the acquisition control unit 173 updates acquisition region information indicating a region to be acquired in each region of the wide range image on the basis of the viewpoint information acquired by the viewpoint information acquisition unit 172.

In step S120, the acquisition control unit 173 requests the distribution server 10 to acquire, together with the image data of the previous viewpoint region, the image data of the high-resolution post-change viewpoint region, which is the viewpoint region after the user's viewpoint has changed and is represented by the updated acquisition region information. The decoder 174-1 acquires image data of the viewpoint region transmitted from the distribution server 10 in response to the request of the acquisition control unit 173, and decodes the image data acquired at the previous timing. The decoder 174-2 starts acquisition of the image data of the post-change viewpoint region transmitted from the distribution server 10 in response to the request of the acquisition control unit 73.

In step S121, the display control unit 176 determines whether or not the high-resolution post-change viewpoint region can be displayed. At this time, since the image data acquired by the decoder 174-2 at the previous timing is image data of the recommended region, it is determined that the post-change viewpoint region cannot be displayed, and the processing proceeds to step S122.

In step S122, the display control unit 176 causes the display unit 177 to display the previous (high-resolution) viewpoint region on the basis of the image data decoded by the decoder 174-1. After step S122, the processing returns to step S120, and steps S120 and S121 are repeated. Steps S120 and S121 are also repeated at timings corresponding to the drawing speed of images on the display unit 177.

On the other hand, if it is determined in step S121 that the high-resolution post-change viewpoint region can be displayed, the processing proceeds to step S123, and the switching unit 175 switches the main line image to the post-change viewpoint region by switching the image data supplied to the display control unit 176 to the image data of the post-change viewpoint region decoded by the decoder 174-2.

In step S124, the display control unit 176 causes the display unit 177 to display the high-resolution post-change viewpoint region on the basis of the image data decoded by the decoder 174-2. After step S124, the processing returns to step S111, and the subsequent processing is repeated.

As described above, a high-resolution viewpoint region is acquired by the decoder 174-1, and a high-resolution recommended region is acquired by the decoder 174-2. As a result, when the user's viewpoint moves to a region other than the recommended region, a delay occurs until the viewing region is displayed with high resolution. However, when the user's viewpoint moves to a recommended region, a recommended region that the user is likely to pay attention is displayed with high resolution. Therefore, the user can view a high-quality image.

(Flow of Operation of Distribution Server)

Next, a flow of operation of the distribution server 10 in FIG. 13 will be described. The flow of operation of the distribution server 10 of FIG. 13 is basically similar to the flow of operation of the distribution server 10 of FIG. 2 described with reference to the flowchart of FIG. 7.

Note, however, that the operation of the distribution server 10 in FIG. 13 is different from the operation of the distribution server 10 in FIG. 13 in that image data to be transmitted to the display device 20 is selected for each of a plurality of streams in response to a request from the display device 20 based on viewpoint information indicating a user's viewpoint and recommended region information indicating a recommended region. Specifically, in addition to image data in which the viewpoint region is encoded with high resolution, image data in which the recommended region is encoded with high resolution is selected as a transmission target to the display device 20.

According to such an operation, image data in which a recommended region is encoded with high resolution is distributed to the display device 20 together with image data in which a viewing region is encoded with high resolution. As a result, even when the user's viewpoint moves to a recommended region where the user is likely to pay attention, the user can view a high-quality image without delay, and more favorable distribution of a wide range image can be achieved.

<5. Example of Processing According to Recommended Region>

Hereinabove, as variations of a recommended region set in a wide range image, the example (FIG. 8) in which a plurality of recommended regions is set and the example (FIG. 10) in which a viewpoint region and a recommended region overlap have been described. Here, details of processing in each case will be described.

(Example of Processing in Case Where Plurality of Recommended Regions Exists)

Figure 15:
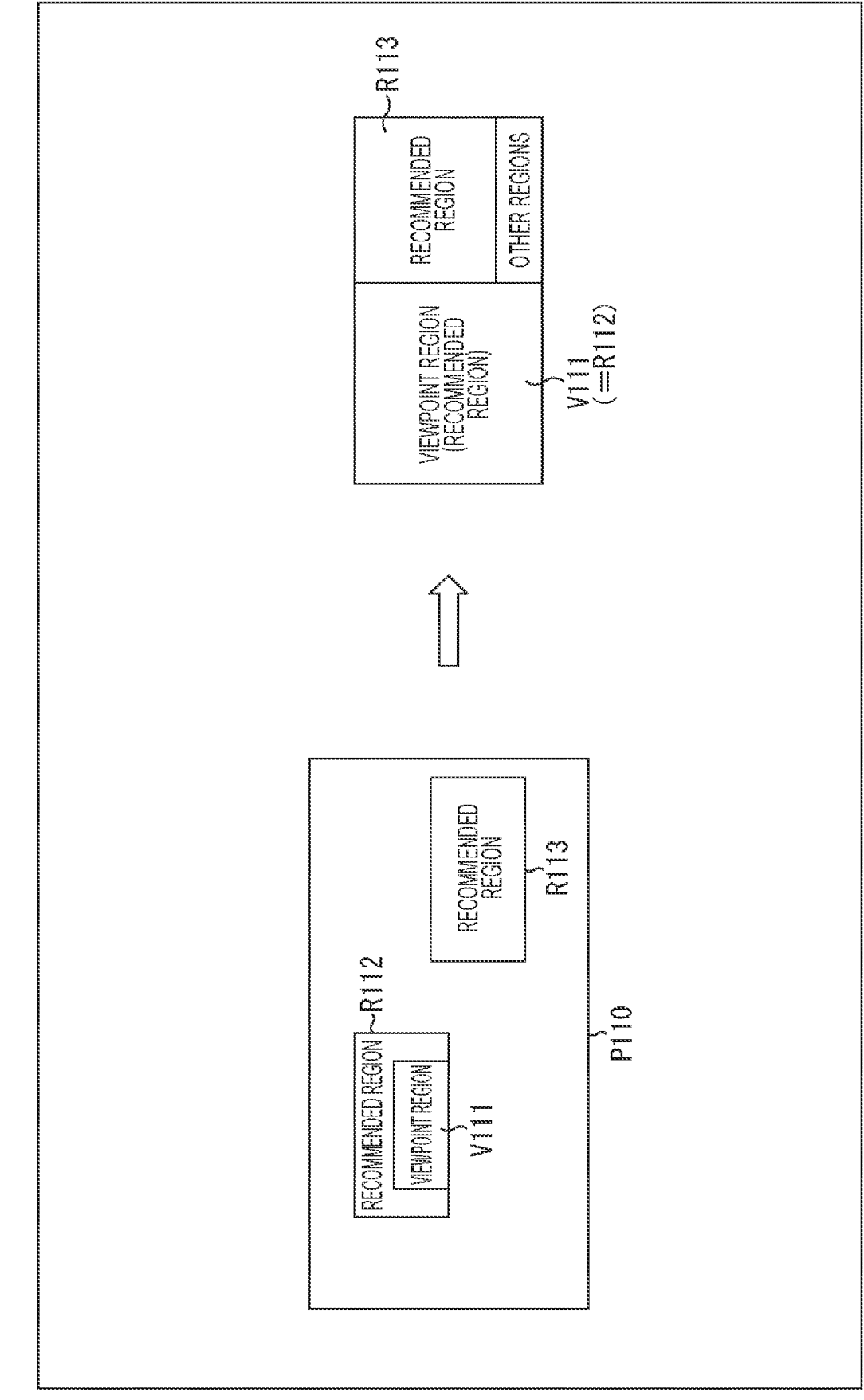
FIG. 15 is a diagram illustrating an example of processing in a case where a plurality of recommended regions exists.
Figure 16:
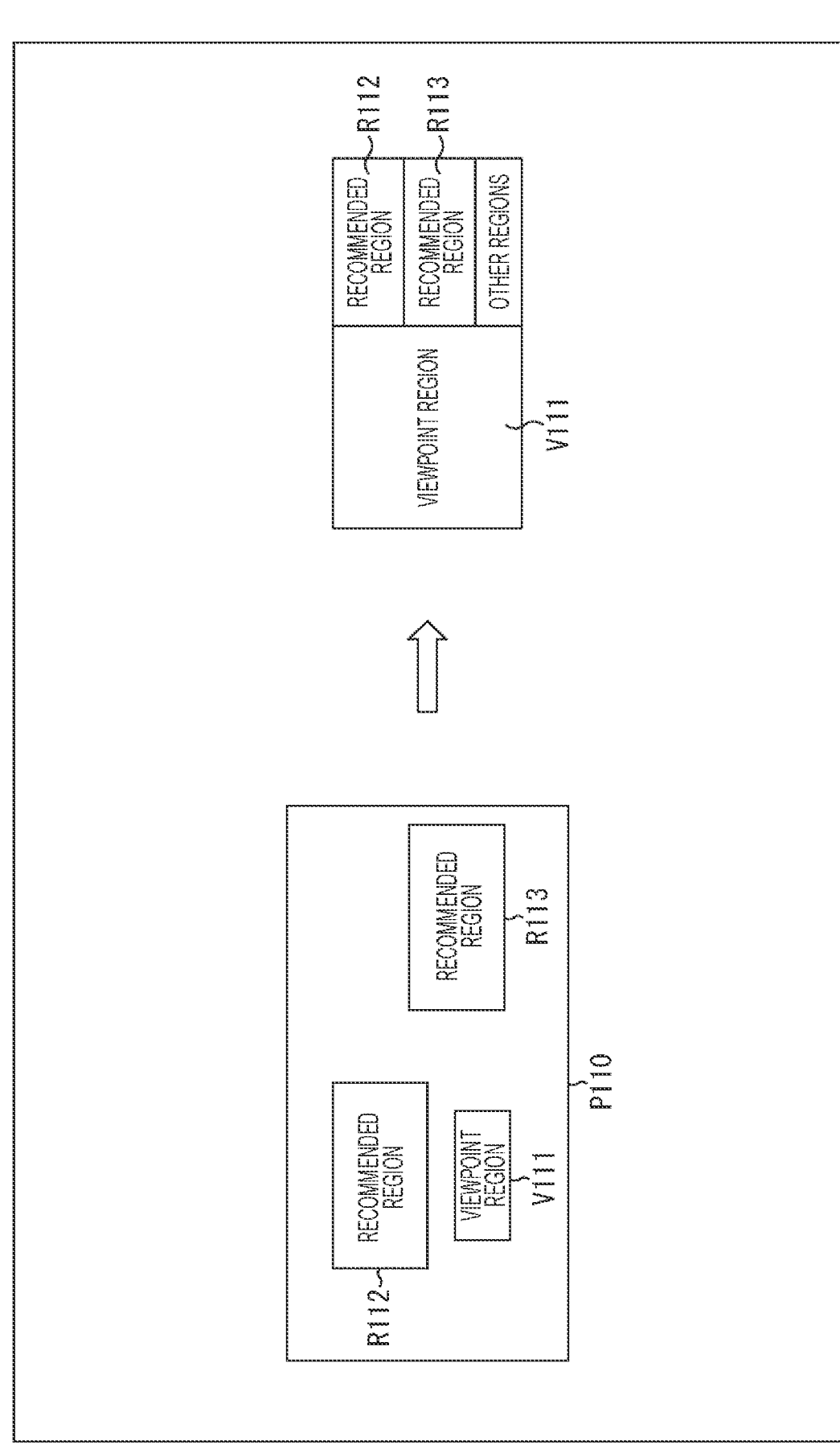
FIG. 16 is a diagram illustrating an example of processing in a case where a plurality of recommended regions exists.
Figure 17:
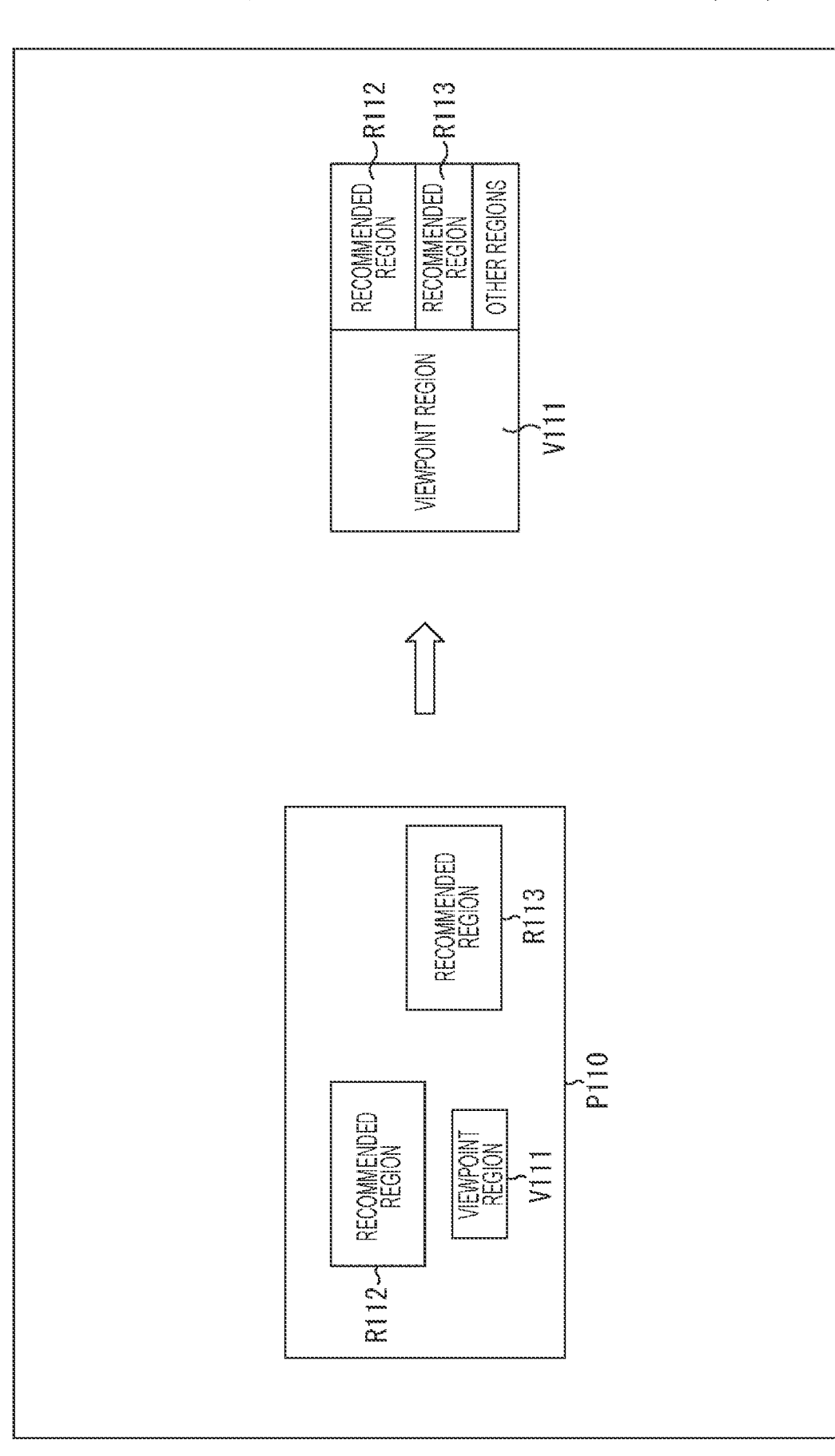
FIG. 17 is a diagram illustrating an example of processing in a case where a plurality of recommended regions exists.

FIGS. 15 to 17 are diagrams illustrating an example of processing in a case where a plurality of recommended regions exists. Here, it is assumed that image data of different resolutions is packed and transmitted as one stream.

In a wide range image P110 illustrated in FIG. 15, two recommended regions R112 and R113 are set in addition to a viewpoint region V111 corresponding to the user's viewpoint. In the example of FIG. 15, the entire viewpoint region V111 overlaps the recommended region R112.

In this case, as illustrated on the right side in the figure, RWP data in which the viewpoint region V111 including the recommended region R112 is packed with high resolution, the recommended region R113 is packed with medium resolution, and the other regions are packed with low resolution is transmitted. That is, the recommended region R112 is regarded as being identical to the viewpoint region V111, and the recommended region R113 is selected as the final recommended region.

In the wide range image P110 illustrated in FIG. 16, too, two recommended regions R112 and R113 are set in addition to the viewpoint region V111 corresponding to the user's viewpoint. Note, however, that in the example of FIG. 16, the viewpoint region V111 does not overlap any of the recommended regions R112 and R113.

In this case, as illustrated on the right side in the figure, RWP data in which the viewpoint region V111 is packed with high resolution, the recommended regions R112 and R113 are packed with medium resolution, and the other regions are packed with low resolution is transmitted. That is, as the final recommended region, the recommended regions R112 and R113 are selected and packed with the same resolution. Note that the resolution (medium resolution) of the recommended regions R112 and R113 in the example of FIG. 16 is lower than the resolution (medium resolution) of the recommended region R113 in the example of FIG. 15.

In the example of FIG. 16, the recommended regions R112 and R113 are packed with the same resolution. However, the resolution may be adjusted according to the weighting on the recommended regions.

For example, similarly to FIG. 16, in a case where two recommended regions R112 and R113 are set in addition to the viewpoint region V111 corresponding to the user's viewpoint in the wide range image P110 illustrated in FIG. 17, the recommended regions are weighted according to the distance to the viewpoint region V111.

In this case, as illustrated on the right side in the figure, while the recommended regions R112 and R113 are selected as final recommended regions, the recommended region R112 close to the viewpoint region V111 is packed with a higher resolution than the recommended region R113 far from the viewpoint region V111.

Furthermore, although not illustrated, the recommended regions may be weighted according to the degree of recommendation based on the user's preference or the user's line-of-sight transition instead of the distance to the viewpoint region V111, or the recommended regions may be weighted according to a result of selection by the user.

Note that in the above description, image data having different resolutions is packed and transmitted as one stream. However, in a case where image data having different resolutions is transmitted as a plurality of streams, similar processing is performed for each stream of corresponding image data.

(Example of Processing in Case Where Viewpoint Region and Recommended Region Overlap)

FIGS. 18 to 21 are diagrams illustrating an example of processing in a case where a viewpoint region and a recommended region overlap. Here, it is assumed that image data of different resolutions is packed and transmitted as one stream.

Figure 18:
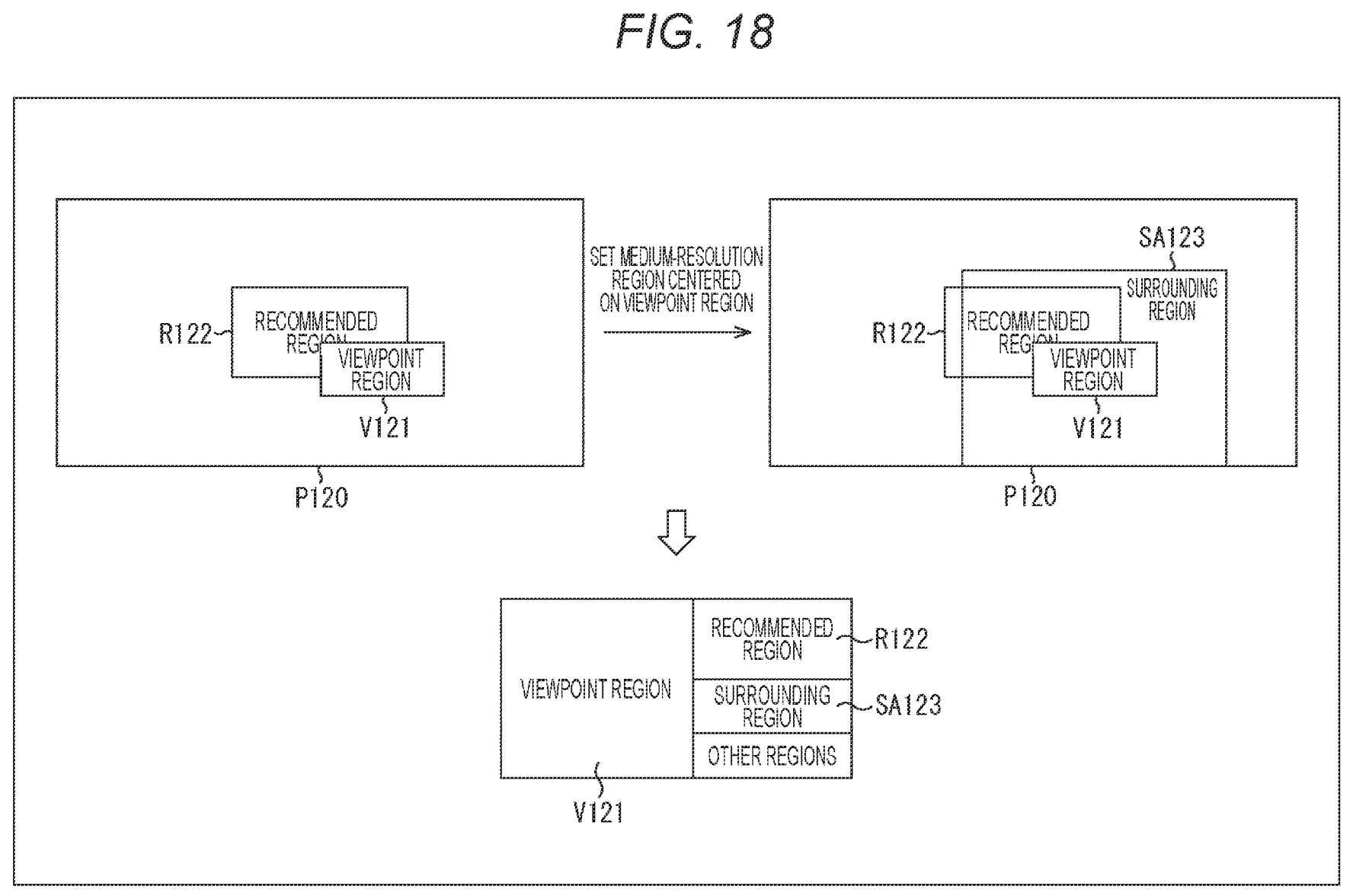

In a wide range image P120 illustrated in FIG. 18, a part of a viewpoint region V121 corresponding to the user's viewpoint overlaps a recommended region R122. As described above, in a situation where it is difficult to estimate which one of the viewpoint region V121 and the recommended region R122 the user's viewpoint will move to, a surrounding region SA123 centered on the viewpoint region V121 is set as a region to be encoded with medium resolution (medium resolution region).

In the example of FIG. 18, as illustrated in the lower part of the drawing, RWP data in which the viewpoint region V121 is packed with high resolution, the recommended region R122 and the surrounding region SA123 are packed with medium resolution, and the other regions are packed with low resolution is transmitted. Note that although the recommended region R122 is packed with a resolution higher than that of the surrounding region SA123 in the example of FIG. 18, the level of resolutions may be reversed.

Figure 19:
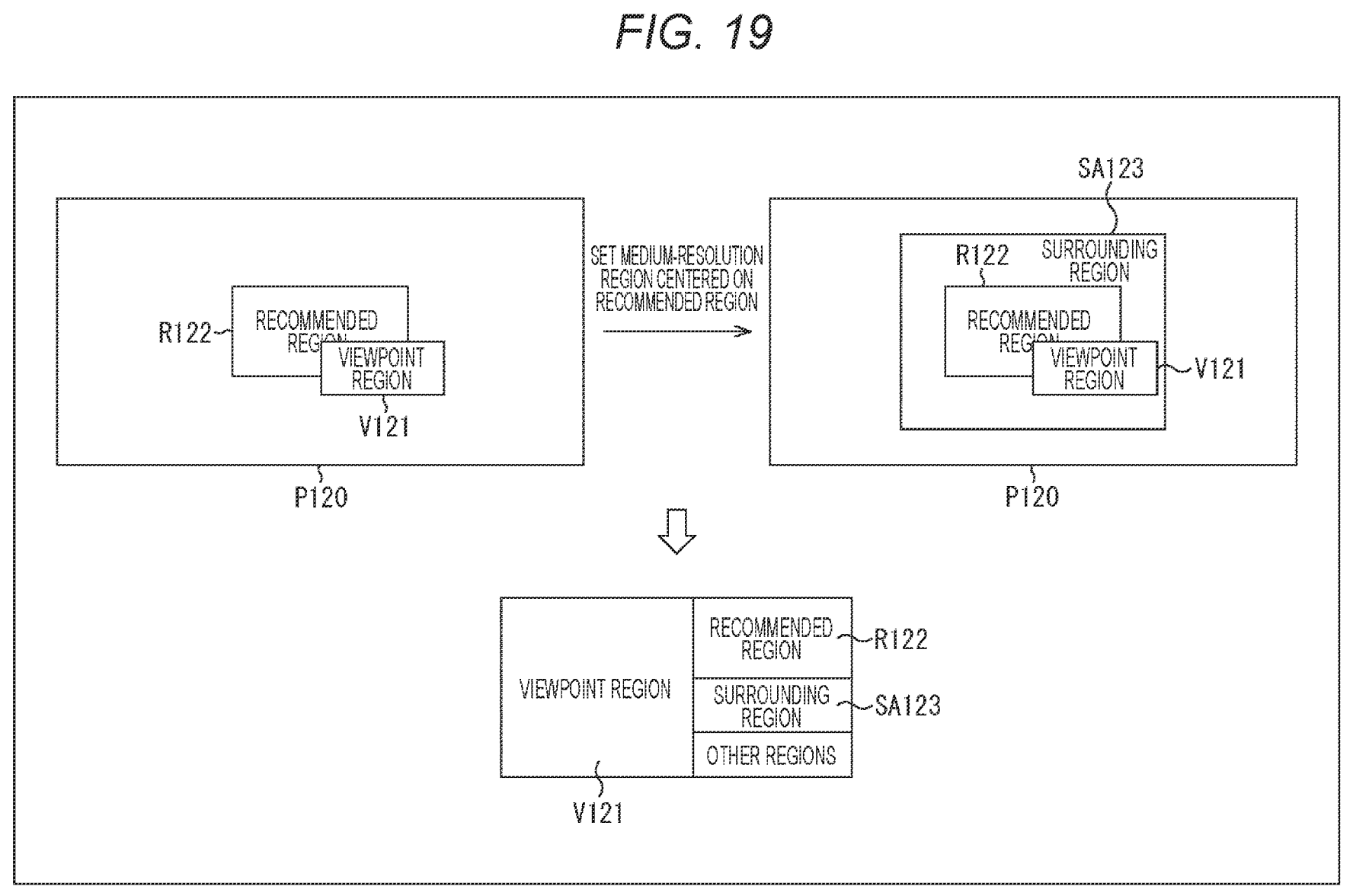

Furthermore, as illustrated in FIG. 19, in a case where the entire region of the viewpoint region V121 is included in the surrounding region SA123 set as the medium-resolution region, the surrounding region SA123 centered on the recommended region R122 may be set.

Figure 20:
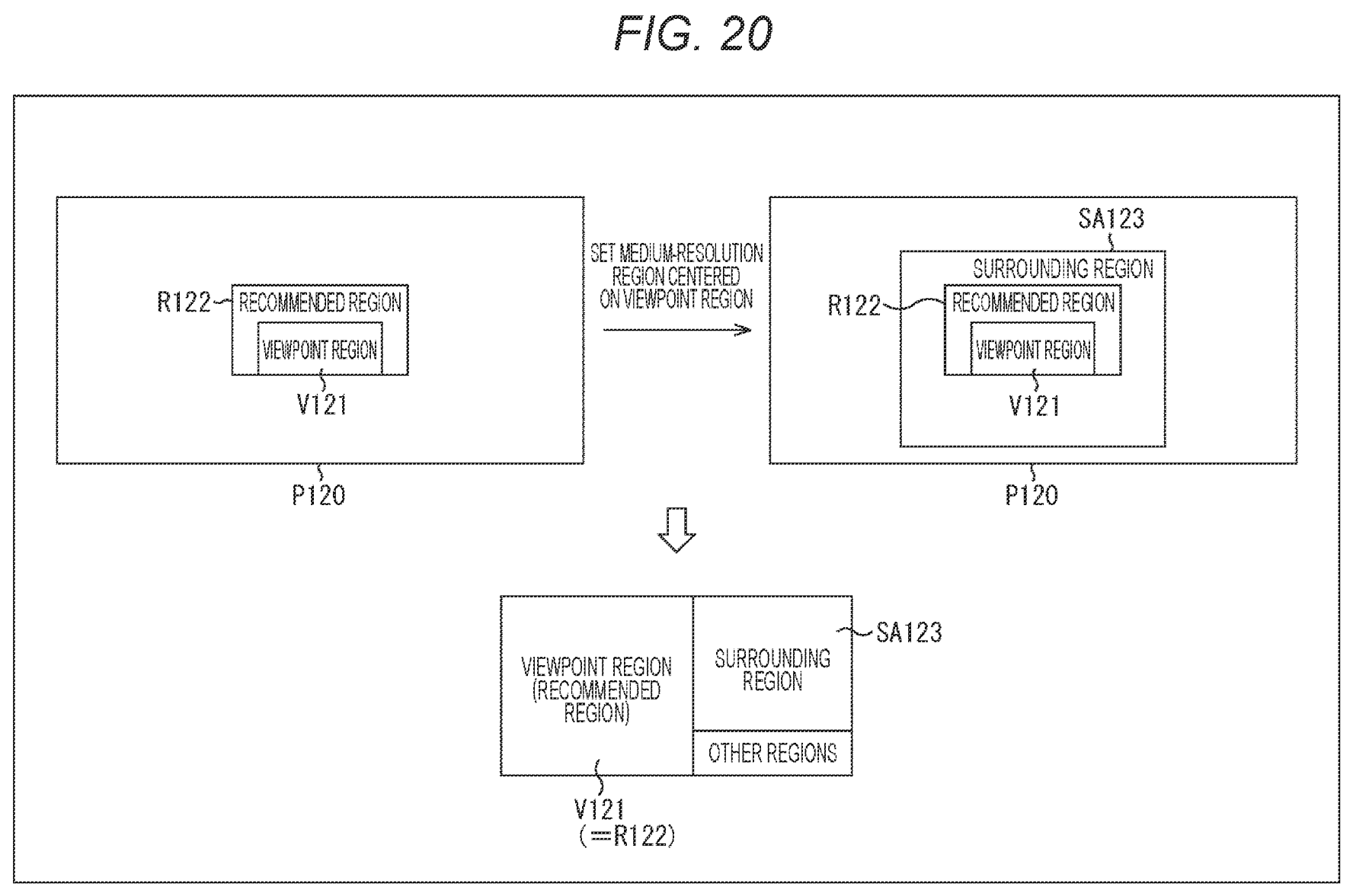

In the wide range image P120 illustrated in FIG. 20, the entire viewpoint region V121 corresponding to the user's viewpoint overlaps the recommended region R122. In this manner, in a situation where the user's viewpoint is in the recommended region R122, the surrounding region SA123 centered on the viewpoint region V121 is set as a medium-resolution region.

In the example of FIG. 20, as illustrated in the lower part of the figure, RWP data in which the viewpoint region V121 including the recommended region R122 is packed with high resolution, the surrounding region SA123 is packed with medium resolution, and the other regions are packed with low resolution is transmitted.

Figure 21:
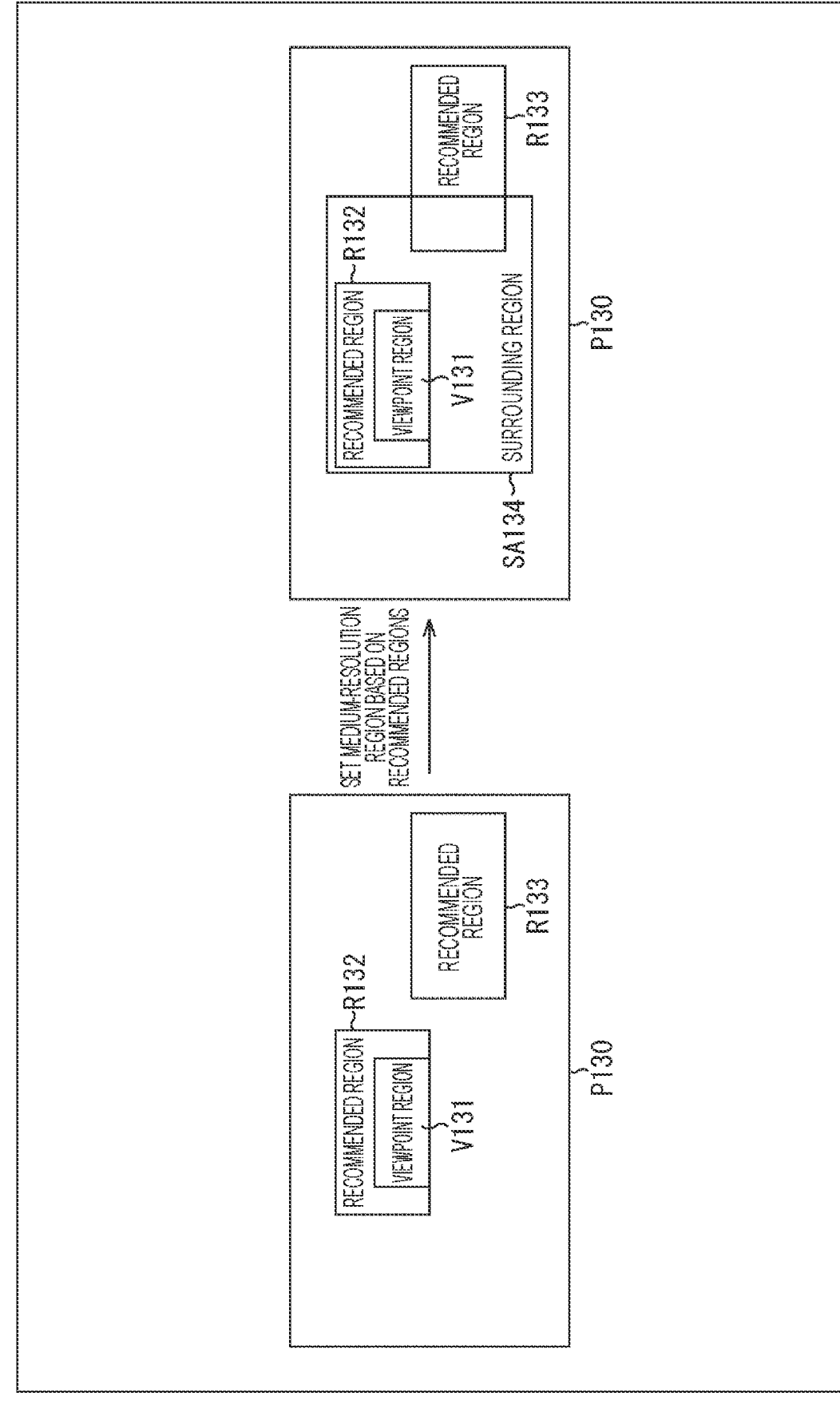
FIG. 21 is a diagram illustrating an example of processing in a case where a viewpoint region and a recommended region overlap.

FIG. 21 illustrates an example of a case where a plurality of recommended regions exists and a viewpoint region and any one of the recommended regions overlap.

In a wide range image P130 illustrated in FIG. 21, two recommended regions R132 and R133 are set in addition to a viewpoint region V131 corresponding to the user's viewpoint, and the entire viewpoint region V131 overlaps the recommended region R132. As described above, in a situation where the user's viewpoint is in one of a plurality of recommended regions (recommended region R132), a surrounding region SA134 based on the plurality of recommended regions is set as a medium-resolution region while including the viewpoint region V131.

In the example of FIG. 21, the surrounding region SA134 is set such that entire recommended region R132 including the viewpoint region V131 and a part of the recommended region R133 are included.

As described above, since the viewpoint region and the recommended region overlap, even in a situation where it is difficult to estimate where the user's viewpoint will move, setting the surrounding region allows the user to view the image with a certain quality.

Note that in the above description, image data having different resolutions is packed and transmitted as one stream. However, in a case where image data having different resolutions is transmitted as a plurality of streams, similar processing is performed for each stream of corresponding image data.

<6. Computer Configuration Example>

The series of processing described above can be performed by hardware or software. In a case where the series of processing is performed by software, a program forming the software is installed from a program recording medium to a computer incorporated in dedicated hardware, a general-purpose personal computer, or the like.

Figure 22:
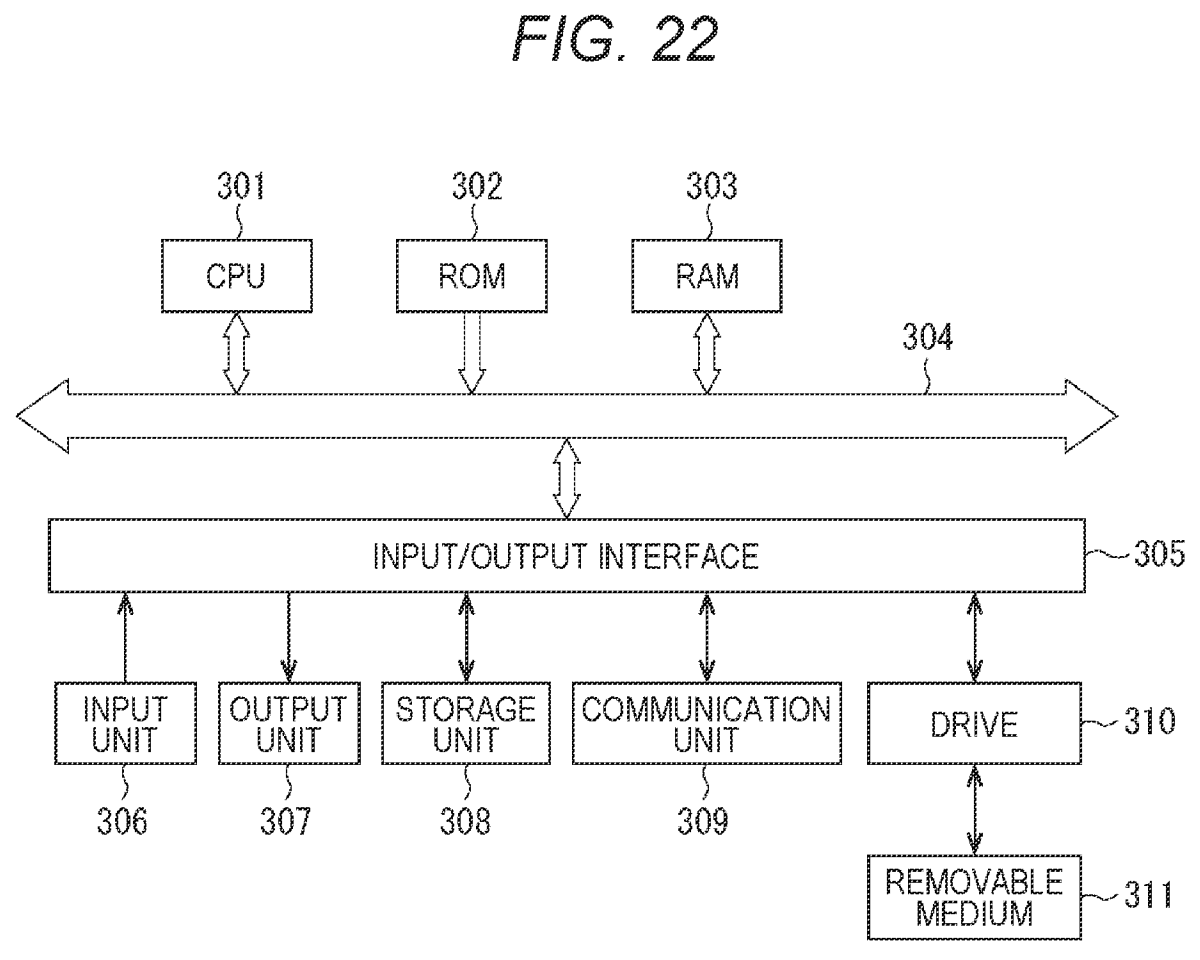

FIG. 22 is a block diagram illustrating a hardware configuration example of a computer that executes the series of processing described above according to a program.

The distribution server 10 and the display device 20 described above are implemented by a computer having the configuration illustrated in FIG. 22.

A central processing unit (CPU) 301, a read only memory (ROM) 302, and a random access memory (RAM) 303 are mutually connected via a bus 304.

An input/output interface 305 is also connected to the bus 304. An input unit 306 including a keyboard, a mouse, and the like, and an output unit 307 including a display, a speaker, and the like are connected to the input/output interface 305. Furthermore, a storage unit 308 including a hard disk, a non-volatile memory, and the like, a communication unit 309 including a network interface and the like, and a drive 310 for driving a removable medium 311 are connected to the input/output interface 305.

In the computer configured as described above, the CPU 301 loads a program stored in the storage unit 308 onto the RAM 303 through the input/output interface 305 and the bus 304, and executes the program to perform the above-described series of processing, for example.

The program executed by the CPU 301 is provided by being recorded in the removable medium 311 or through a wired or wireless transmission medium such as a local area network, the Internet, or digital broadcasting, and is installed in the storage unit 308, for example.

Note that the program executed by the computer may be a program that performs processing in chronological order according to the order described in the present specification, or a program that performs processing in parallel, or at a necessary timing such as when a call is made.

Embodiments of the present disclosure are not limited to the above-described embodiments, and various modifications can be made without departing from the scope of the present disclosure.

Furthermore, the effect described in the present specification is merely an illustration and is not restrictive. Hence, other effects can be obtained.

Moreover, the present disclosure can have the following configurations.

(1)

An information processing device including a control unit that performs control to encode, in an image, a viewpoint region corresponding to a user's viewpoint on a display device with a first resolution, a recommended region set in the image with a second resolution, and another region with a third resolution lower than the first resolution and the second resolution.

(2)

The information processing device according to (1), in which the first resolution is higher than or equal to the second resolution.

(3)

The information processing device according to (1), in which the control unit selects a transmission target to the display device from among a plurality of pieces of image data obtained by encoding regions of the image on the basis of at least one of viewpoint information indicating the user's viewpoint or recommended region information indicating the recommended region.

(4)

The information processing device according to (3), in which the control unit performs control to transmit the image data selected as the transmission target as one stream.

(5)

The information processing device according to (4), in which when the user's viewpoint moves to the recommended region, the control unit selects, as the transmission target, the image data in which the recommended region is encoded with the first resolution.

(6)

The information processing device according to (4) or (5), in which the image data includes region wise packing (RWP) data obtained by packing the image while changing resolution for each region.

(7)

The information processing device according to (3), in which the control unit performs control to transmit the image data selected as the transmission target as a plurality of streams.

(8)

The information processing device according to (7), in which the control unit selects, as the transmission target, the image data in which the recommended region is encoded with the first resolution, in addition to the image data in which the viewpoint region is encoded with the first resolution.

(9)

The information processing device according to (7) or (8), in which the image data includes hierarchical data obtained by hierarchizing regions of the image for each resolution.

(10)

The information processing device according to (7) or (8), in which the image data includes region wise packing (RWP) data obtained by packing the image while changing resolution for each region.

(11)

The information processing device according to any one of (3) to (10), in which in a case where a plurality of the recommended regions exists, the control unit selects the recommended region selected on the basis of at least one of the user's operation, preference, or line-of-sight transition as a final recommended region.

(12)

The information processing device according to any one of (3) to (11), in which in a case where the viewpoint region and the recommended region partially or entirely overlap, the control unit selects, as the transmission target, the image data in which a surrounding region including at least a part of the viewpoint region and the recommended region is encoded with the second resolution.

(13)

The information processing device according to any one of (1) to (12), in which the recommended region includes a peripheral region of the recommended region.

(14)

An information processing method including an information processing device performing control to encode, in an image, a viewpoint region corresponding to a user's viewpoint on a display device with a first resolution, a recommended region set in the image with a second resolution, and another region with a third resolution lower than the first resolution and the second resolution.

(15)

An information processing device including:

an acquisition control unit that performs control to acquire, from an image transmitted from a distribution server, image data in which a viewpoint region corresponding to a user's viewpoint is encoded with a first resolution and the image data in which a recommended region set in the image is encoded with a second resolution via different transmission paths; and a display control unit that displays the viewpoint region on the basis of the image data, in which when the user's viewpoint moves to the recommended region, the display control unit displays the recommended region instead of the viewpoint region.

(16)

The information processing device according to (15), in which the first resolution is higher than or equal to the second resolution.

(17)

The information processing device according to (15) or (16), in which the acquisition control unit controls acquisition of the image data on the basis of viewpoint information indicating the user's viewpoint and recommended region information indicating the recommended region.

(18)

The information processing device according to any one of (15) to (17), in which in a case where a plurality of the recommended regions exists, the acquisition control unit selects the recommended region to be finally acquired on the basis of at least one of the user's operation, preference, or line-of-sight transition.

(19)

An information processing method including:

an information processing device acquiring, from an image transmitted from a distribution server, image data in which a viewpoint region corresponding to a user's viewpoint is encoded with a first resolution and the image data in which a recommended region set in the image is encoded with a second resolution via different transmission paths;

displaying the viewpoint region on the basis of the image data; and when the user's viewpoint moves to the recommended region, displaying the recommended region instead of the viewpoint region.

(20)

An information processing system including:

a distribution server; and a display device, in which the distribution server includes a control unit that performs control to encode, in an image, a viewpoint region corresponding to a user's viewpoint on the display device with a first resolution, a recommended region set in the image with a second resolution, and another region with a third resolution lower than the first resolution and the second resolution.

REFERENCE SIGNS LIST

1 Image distribution system
10 Distribution server
20 Display device
31 Camera
32 Sensor
51 Encoder
52 Transmission unit
53 Control unit
71 Recommended region information acquisition unit
72 viewpoint information acquisition unit
73 Acquisition control unit
74 Buffer
75 Decoder
76 Display control unit
77 Display unit
151 Encoder
152 Transmission unit
153 Control unit
171 Recommended region information acquisition unit
172 viewpoint information acquisition unit
173 Acquisition control unit
174-1, 174-2 Decoder
175 Switching unit
176 Display control unit
177 Display unit

The invention claimed is:

1. An information processing device comprising:
circuitry configured to perform control to encode, in an image,
a viewpoint region corresponding to a user's viewpoint on a display device with a first resolution,
a recommended region set in the image with a second resolution, and
at least one other region with a third resolution lower than the first resolution and the second resolution,
wherein the second resolution is determined according to a spatial relation between the viewpoint region and the recommended region, and
wherein the second resolution is determined according to by comparing a distance between the viewpoint region and the recommended region with a respective distance between the viewpoint region at least one other recommended region.

2. The information processing device according to claim 1,
wherein the first resolution is higher than or equal to the second resolution.

3. The information processing device according to claim 1,
wherein the circuitry is further configured to select a transmission target to the display device including image data selected from among a plurality of pieces of image data obtained by encoding regions of the image based on at least one of viewpoint information indicating the user's viewpoint or recommended region information indicating the recommended region.

4. The information processing device according to claim 3,
wherein the circuitry is further configured to perform control to transmit the image data selected as the transmission target as one stream.

5. The information processing device according to claim 4,
wherein when the user's viewpoint moves to the recommended region, the circuitry selects, as the transmission target, the image data in which the recommended region is encoded with the first resolution.

6. The information processing device according to claim 4,
wherein the image data includes region wise packing (RWP) data obtained by packing the image while changing resolution for each region.

7. The information processing device according to claim 3,
wherein the circuitry is further configured to perform control to transmit the image data selected as the transmission target as a plurality of streams.

8. The information processing device according to claim 7,
wherein the circuitry selects, as the transmission target, the image data in which the recommended region is encoded with the first resolution, in addition to the image data in which the viewpoint region is encoded with the first resolution.

9. The information processing device according to claim 7,
wherein the image data includes hierarchical data obtained by hierarchizing regions of the image for each resolution.

10. The information processing device according to claim 7,
wherein the image data includes region wise packing (RWP) data obtained by packing the image while changing resolution for each region.

11. The information processing device according to claim 3,
wherein in a case where a plurality of the recommended regions exists, the circuitry is further configured to select the recommended region selected based on at least one of an operation of the user, preference, or line-of-sight transition as a final recommended region.

12. The information processing device according to claim 3,
wherein in a case where the viewpoint region and the recommended region partially or entirely overlap, the circuitry selects, as the transmission target, the image data in which a surrounding region including at least a part of the viewpoint region and the recommended region is encoded with the second resolution.

13. The information processing device according to claim 1,
wherein the recommended region includes a peripheral region of the recommended region.

14. An information processing method comprising:
encoding, by an information processing device,
a viewpoint region in an image corresponding to a user's viewpoint on a display device with a first resolution,
a recommended region set in the image with a second resolution, and
at least one other set in the image with a third resolution lower than the first resolution and the second resolution,
wherein the second resolution is determined according to a spatial relation between the viewpoint region and the recommended region, and
wherein the second resolution is determined according to by comparing a distance between the viewpoint region and the recommended region with a respective distance between the viewpoint region at least one other recommended region.

15. An information processing system comprising:
a distribution server; and
a display device,
wherein the distribution server includes circuitry configured to perform control to encode, in an image,
a viewpoint region corresponding to a user's viewpoint on the display device with a first resolution,
a recommended region set in the image with a second resolution, and
at least one other with a third resolution lower than the first resolution and the second resolution,
wherein the second resolution is determined according to a spatial relation between the viewpoint region and the recommended region, and
wherein the second resolution is determined according to by comparing a distance between the viewpoint region and the recommended region with a respective distance between the viewpoint region at least one other recommended region.

* * * * *